(12) United States Patent
Amann

(10) Patent No.: US 10,643,175 B2
(45) Date of Patent: May 5, 2020

(54) TRACKING PARTS IN MANUFACTURING AND SERVICE FACILITIES

(71) Applicant: WEIR GROUP IP LIMITED, Glasgow (GB)

(72) Inventor: Andrew Amann, Wakefield, MA (US)

(73) Assignee: Weir Group IP Limited, Glasgow (GB)

( * ) Notice: Subject to any disclaimer, the term of this patent is extended or adjusted under 35 U.S.C. 154(b) by 415 days.

(21) Appl. No.: 15/230,382

(22) Filed: Aug. 6, 2016

(65) Prior Publication Data

US 2017/0039516 A1 Feb. 9, 2017

Related U.S. Application Data

(60) Provisional application No. 62/202,762, filed on Aug. 7, 2015, provisional application No. 62/202,764, filed on Aug. 7, 2015, provisional application No. 62/202,761, filed on Aug. 7, 2015.

(51) Int. Cl.

| | |
|---|---|
| G06Q 10/08 | (2012.01) |
| H04W 4/02 | (2018.01) |
| H04B 17/318 | (2015.01) |
| H04W 4/70 | (2018.01) |
| H04W 4/80 | (2018.01) |
| H04W 4/029 | (2018.01) |
| H04W 4/33 | (2018.01) |
| H04B 17/23 | (2015.01) |
| H04B 17/27 | (2015.01) |
| H04W 4/06 | (2009.01) |

(52) U.S. Cl.
CPC ........... *G06Q 10/087* (2013.01); *H04B 17/23* (2015.01); *H04B 17/27* (2015.01); *H04B 17/318* (2015.01); *H04W 4/023* (2013.01); *H04W 4/029* (2018.02); *H04W 4/06* (2013.01); *H04W 4/33* (2018.02); *H04W 4/70* (2018.02); *H04W 4/80* (2018.02)

(58) Field of Classification Search
CPC .................................................... G01C 21/165
USPC ........................................................... 705/28
See application file for complete search history.

(56) References Cited

U.S. PATENT DOCUMENTS

| | | |
|---|---|---|
| 2007/0114280 A1 | 5/2007 | Coop et al. |
| 2007/0194921 A1 | 8/2007 | Watanabe et al. |
| 2009/0037244 A1 | 2/2009 | Pemberton |

(Continued)

OTHER PUBLICATIONS

Non-Final Office Action dated Apr. 8, 2019 in connection with U.S. Appl. No. 15/230,383, 14 pages.

(Continued)

*Primary Examiner* — Russell S Glass

(57) ABSTRACT

Parts in a manufacturing or service facility are electronically tracked using wireless beacons, strategically positioned receiver devices in the facility, and a monitoring server. The wireless beacons are individually coupled to the parts in the facility and equipped with sensors that wake the wireless beacons up to wirelessly transmit location signals when sensed data indicates the parts are moving to the receiver devices. The receiver devices, in turn, transmit the location signals across a network to the monitoring server, which uses the location signals and identifiers of the receiver devices to locate the work areas of the facility in which the wireless beacons—and thus coupled parts—are located.

20 Claims, 12 Drawing Sheets

(56) References Cited

U.S. PATENT DOCUMENTS

| | | | |
|---|---|---|---|
| 2013/0166198 A1* | 6/2013 | Funk | G01C 21/165 |
| | | | 701/446 |
| 2013/0233922 A1 | 9/2013 | Schoening et al. | |
| 2013/0342391 A1 | 12/2013 | Hoang et al. | |
| 2014/0125501 A1 | 5/2014 | Baade | |
| 2015/0247916 A1* | 9/2015 | Bartov | G01S 5/0257 |
| | | | 455/456.6 |
| 2015/0350817 A1 | 12/2015 | Huntington et al. | |

OTHER PUBLICATIONS

Non-Final Office Action dated Dec. 13, 2017 in connection with U.S. Appl. No. 15/230,386, 31 pages.
Final Office Action dated Jul. 5, 2018 in connection with U.S. Appl. No. 15/230,386, 40 pages.
Non-Final Office Action dated May 2, 2019 in connection with U.S. Appl. No. 15/230,386, 34 pages.

* cited by examiner

TRACKING PARTS IN MANUFACTURING AND SERVICE FACILITIES

CROSS REFERENCE TO RELATED APPLICATIONS

This application claims the benefit of U.S. Provisional Application Ser. No. 62/202,761 filed on Aug. 7, 2015 and entitled "MONITORING PARTS IN A FACILITY"; U.S. Provisional Application Ser. No. 62/202,762 filed on Aug. 7, 2015 and entitled "TRACKING PARTS IN MANUFACTURING AND SERVICE FACILITIES"; and U.S. Provisional Application Ser. No. 62/202,764 filed on Aug. 7, 2015 and entitled "PRESENTATION OF REAL-TIME LOCATIONS OF PARTS IN A MANUFACTURING OR SERVICE FACILITY." These three provisional patent applications are hereby incorporated by reference in their entirety for all intents and purposes.

TECHNICAL FIELD

This disclosure generally relates to tracking parts in a manufacturing or service facility and, more specifically, to using wireless beacons coupled to parts and receiver devices strategically placed in the facility to communicate and relay location signals to computing devices that can identify in real time the location of the parts in the facility.

BACKGROUND

To function efficiently, manufacturing and service facilities depend on getting the right component part to the right worker at the right time. Modern facilities are typically divided into different work areas (e.g., receiving, welding, assembly, shipping, etc.), and parts are brought to specialized workers in those areas to perform a job function. Many inefficiencies result from the logistics involved with moving parts around a facility floor. If the correct part is not in the appropriate work area at the right time, a worker has to waste time finding the part somewhere in the facility.

Additionally, many of today's manufacturing and service facilities use paperwork to detail job tasks needing to be performed to build or service a particular part. Using paperwork to track part manufacturing and service tasks is cumbersome, inaccurate, and often requires more time finding and keeping the requisite paperwork up to date than manufacturing or servicing the part. A worker typically has to locate the appropriate paperwork, update it correctly when a specific job task is finished, and then ensure it is affixed to the part during travel to the next work area. Such a process is only as good as the workers who maintain the accuracy of the paperwork, and even the best workers typically cannot ensure the appropriate paperwork always follows an associated part. Countless man hours are wasted tracking such paperwork and keeping it up to date. And the typical reaction of management to improve the efficiency of the process is to add additional paperwork, tracking steps, or other administrative tasks, most of which further complicate things.

Even worse, worker productivity is drastically reduced when workers must search for parts that are not in the correct work areas. Welders hunting for paperwork or parts spend less time actually welding. The end goal of any manufacturing or service facility is to maximize the amount of time specialized workers spend performing their specialized job tasks. Miring workers down with administrative paper tasks or part-hunting expeditions reduces the time spent actually manufacturing or servicing parts.

SUMMARY

This summary is provided to introduce a selection of concepts in a simplified form that are further described below in the Detailed Description. This summary is not intended to identify key features or essential features of the claimed subject matter. Nor is it intended to be used as an aid in determining the scope of the claimed subject matter.

One embodiment is directed to a system for tracking parts through different work areas of a manufacturing or service facility. The system includes at least one wireless beacon coupled to a part located in the manufacturing or service facility. The wireless beacon is configured to wirelessly transmit location signals as the part moves through the different work areas. The system also includes a plurality of receiver devices configured to capture the location signal at different signal strengths from the at least one wireless beacon and transmit the location signal and the different signal strengths across a network. The system also includes one or more monitoring servers configured determine a location of the part in the manufacturing or service facility based upon the location signal and the different signal strengths captured by the plurality of receiver devices. The tracking system provides real-time locations of the part in such a facility.

In one embodiment, the wireless beacon includes a Bluetooth transmission circuit configured to wirelessly transmit the location signal using a Bluetooth protocol. The Bluetooth transmission protocol may specifically be a Bluetooth low-energy (LE) transmission protocol.

In one embodiment, the wireless beacon includes a transmitter configured to wirelessly transmit the location signals by one or more of a Zigbee, radio frequency identification (RFID), WirelessHD, WiGig, and Z-Wave transmission.

In one embodiment, the wireless beacon includes memory configured to store a unique beacon identifier related to the at least one wireless beacon. In one embodiment, the wireless beacon includes memory configured to store a part identifier that is associated with the part.

In one embodiment, the wireless beacon includes one or more sensors that capture sensor data that is used to determine when to wirelessly transmit the location signals. In one embodiment, the sensors include an accelerometer. In one embodiment, the wireless beacon is configured to wirelessly transmit the location signals when the accelerometer senses a threshold acceleration or movement.

In one embodiment, the sensors include a magnetometer. In one embodiment, the wireless beacon is configured to wirelessly transmit the location signal when the magnetometer senses a threshold magnetic field.

In one embodiment, the sensors include at least one member of a group including a pressure sensor, a photometer, a thermometer, a global positioning system (GPS) sensor, a gyroscope, and a rotational vector.

In one embodiment, the wireless beacon is configured to wirelessly transmit the location signal based on values sensed by the sensors.

In one embodiment, the monitoring servers are configured to determine the location of the part by triangulating location points in the manufacturing or service facility.

In one embodiment, the wireless beacon is coupled to the part using plastic, metallic, or rubber band. In another embodiment, the wireless beacon is coupled to the part using an adhesive. In still another embodiment, the wireless beacon is coupled to the part using at least one member of a group including: a tie, a rope, a string, a clasp, a hook, Velcro, a magnet, a clip, and a fastener. In still another embodiment, the wireless beacon is coupled to the part using at least one container, bag, pocket, and receptacle.

In one embodiment, the receiver devices are configured to transmit a receiver device identifier to the monitoring servers along with the location signal.

Another embodiment is directed to a system for tracking a part through different work areas of a facility. The system includes at least one wireless beacon associated with the part located in the facility, and the at least one wireless beacon is configured to transmit location signals at different times as the part moves through the different work areas. The system also includes a plurality of receiver devices configured to wirelessly receive the location signals from the at least one wireless beacon and determine a location in the facility of the at least one wireless beacon. The location includes at least one of the different work areas. The tracking system provides real-time locations of the part in such a facility.

In one embodiment, the wireless beacon wirelessly includes a Bluetooth transmission circuit configured to wirelessly transmit the location signals using a Bluetooth protocol. The Bluetooth transmission protocol is a Bluetooth low energy protocol.

In one embodiment, the wireless beacon includes memory configured to store a unique beacon identifier related to the at least one wireless beacon.

In one embodiment, the wireless beacon includes memory configured to store a part identifier that is associated with the part.

In one embodiment, the facility includes a manufacturing facility. In one embodiment, the facility includes a service facility. In one embodiment, the facility includes a wholesale or a retail facility.

In one embodiment, the wireless beacon includes one or more sensors that capture sensor data that is used to determine when to wirelessly transmit the location signal.

In one embodiment, the sensors including at least one member of a group that includes an accelerometer, a magnetometer, a pressure sensor, a photometer, a thermometer, a GPS sensor, a gyroscope, and a rotational vector sensor.

In one embodiment, the part includes at least member of a group including: a fluid end, a swivel, a joint, a manifold trailer, safety iron, a safety hammer, a dart valve, a plug valve, a clapper check valve, a pressure relief valve, an emergency unloading valve, a gate valve, a subsea dosage valve, a hydraulic valve, a valve seat, a butterfly valve, a steadseal valve, a hyperseal valve, a Polytetrafluoroethylene-lined valve, a swingthrough valve, a rubber-sealing valve, a rubber-line valve, a fire safe valve, a swing and lift check valve, a T-pattern globe valve, a Y-pattern globe valve, a three-way globe valve, a compressor check valve, a cold reheat check valve, a cold heat check valve, a testable check valve, a reverse current valve, a parallel slide valve, a gate valve, a safety valve, a safety relief valve, an isolation valve, a relief valve, a mounted-ball valve, a ball valve, a diaphragm valve, a triple offset butterfly valve, a gate and globe valve, a check valve, a lift check valve, a swing check valve, a steam isolation valve, a feedwater isolation valve, an integrated safety valve, a single-stage turbine, a multi-stage turbine, a hydraulic turbine, a pump turbine, a quad-runner turbine, a gear operator, a pneumatic actuator, a pressure control panel, a lifting clamp, a flow line safety restraint, a choke, a drop ball injector, a pump, a blowout preventer, a gas separator, an overshot connector, a wellhead, a frac pump, a manifold system, a fluid end system, a slurry pump, a water pump, a subsea pump, a premix tank, a frac tree, a swellable packer, a manifold skid, a tubing head, a wellhead, a rod rotator, a stuffing box, casing head, a tubing head, and a control valve.

Another embodiment is directed to a computing device for tracking a part in one or more manufacturing or service facilities. The computing device includes a receiver to receive at least one location signal of a wireless beacon coupled to a part in the one or more manufacturing or service facilities; computer-storage memory configured to store the at least one location signal; and a processor programmed to determine a location of the part in the one or more manufacturing or service facilities based on the at least one location signal of the wireless beacon by analyzing the signal strength of the at least one location signal as received by the receiver. The computing device provides a mechanism for tracking parts in a manufacturing facility in real time.

Another embodiment is directed to a computing device for tracking a part in one or more manufacturing or service facilities. The computing device includes a receiver configured to receive: (1) instances of a location signal broadcast by a wireless beacon, and (2) signal strengths of the location signal as captured by different receiver devices. The wireless beacon us coupled to a part in the manufacturing or service facilities. The device also includes memory computer-storage memory configured to store the instances of the location signal and the signal strengths of the location signal as captured by the different receiver devices, a processor programmed to determine a location of the part in the one or more manufacturing or service facilities by analyzing the signal strengths of the location signal as captured by the different receiver devices, and a transmitter configured to transmit the location of the part to client computing device.

In one embodiment, the processor is configured to determine the location of the part in the one or more manufacturing or service facilities through triangulating a location using the signal strengths of the location signal received by the receiver and at least one other receiver.

In one embodiment, the processor is configured to determine the location of the part in the one or more manufacturing or service facilities through triangulating a location using the signal strengths of the location signal. In one embodiment, the processor is configured to triangulate the location through estimating location shapes using the signal strengths of the location signal and identify a location point to be a position at which the location shapes intersect.

In one embodiment, the processor is configured to generate a grid representative of a plurality of areas in the one or more manufacturing or service facilities; assign counter values to the plurality of areas represented in the grid; estimate location shapes using signal strengths of the location signal; increment the counter values based on the possible location shapes; and determine a location point for the part based on the counter values.

Another embodiment is directed to a method for tracking a part in one or more manufacturing or service facilities. The method includes: receiving location signals of a wireless beacon coupled to a part in the one or more manufacturing or service facilities, analyzing signal strengths of the location signals as received at one or more receiver devices, determining a work area in the manufacturing or service facilities in which the part is located based on the signal strengths of the location signals, storing an indication of the work area in which the part is located, and transmitting an indication of the work area to a client computing device for display.

In one embodiment, the location signals are wirelessly received from the wireless beacon as a Bluetooth low energy transmission.

One embodiment further includes determining a sub-work area within the work area in which the part is located based on the signal strengths of the location signals.

In one embodiment, the part includes at least member of a group including: a fluid end, a swivel, a joint, a manifold trailer, safety iron, a safety hammer, a dart valve, a plug valve, a clapper check valve, a pressure relief valve, an emergency unloading valve, a gate valve, a subsea dosage valve, a hydraulic valve, a valve seat, a butterfly valve, a steadseal valve, a hyperseal valve, a Polytetrafluoroethylene-lined valve, a swingthrough valve, a rubber-sealing valve, a rubber-line valve, a fire safe valve, a swing and lift check valve, a T-pattern globe valve, a Y-pattern globe valve, a three-way globe valve, a compressor check valve, a cold reheat check valve, a cold heat check valve, a testable check valve, a reverse current valve, a parallel slide valve, a gate valve, a safety valve, a safety relief valve, an isolation valve, a relief valve, a mounted-ball valve, a ball valve, a diaphragm valve, a triple offset butterfly valve, a gate and globe valve, a check valve, a lift check valve, a swing check valve, a steam isolation valve, a feedwater isolation valve, an integrated safety valve, a single-stage turbine, a multi-stage turbine, a hydraulic turbine, a pump turbine, a quad-runner turbine, a gear operator, a pneumatic actuator, a pressure control panel, a lifting clamp, a flow line safety restraint, a choke, a drop ball injector, a pump, a blowout preventer, a gas separator, an overshot connector, a wellhead, a frac pump, a manifold system, a fluid end system, a slurry pump, a water pump, a subsea pump, a premix tank, a frac tree, a swellable packer, a manifold skid, a tubing head, a wellhead, a rod rotator, a stuffing box, casing head, a tubing head, and a control valve.

One embodiment further includes calculating distances of the receiver devices from the part based on the signal strength of the location signals.

One embodiment further includes triangulating a location point of the part bases on the calculated distances of the receiver devices.

Another embodiment is directed to a method for tracking parts in one or more manufacturing or service facilities. The method includes: receiving location signals of wireless beacons coupled to the parts in the one or more manufacturing or service facilities; receiving receiver device identifiers corresponding to receiver devices in the one or more manufacturing or service facilities; analyzing signal strengths of the location signals as received at one or more receiver devices; determining work areas in which the parts are located based on the signal strengths of the location signals; and storing indications of the work areas in which the part is located. Tracking parts in such a manner provides real-time knowledge of the parts in the manufacturing facility that can be used to clear up inefficiencies, forecast order completions, track worker productivity, and generally organize the manufacturing or servicing facility.

Another embodiment is directed to one or more computer storage media embodying computer-executable components. A receiver component is configured to receive location signals associated with a wireless beacon coupled to a part in a manufacturing or service facility. A part location component is configured to: determine signal strengths of the location signals received at receiver devices, and determine a work area of the manufacturing or service facility in which the part is located based on the signal strengths of the location signals received at the receiver devices. The system tracks provides real-time knowledge of parts' locations in the manufacturing facility, and such knowledge can be used to clear up inefficiencies, forecast order completions, track worker productivity, and generally organize the manufacturing or servicing facility.

Another embodiment includes a receiver device map component configured to generate a map of work areas and sub-work areas in the manufacturing or service facility. In one embodiment, the receiver device map component is configured to assign the receiver devices to at least one of the work areas or sub-work areas.

Another embodiment is directed to a method for tracking parts in a facility. The method includes: receiving location signals of wireless beacons coupled to the parts in the facility; receiving receiver device identifiers corresponding to receiver devices in the facility that received the location signals; analyzing signal strengths of the location signals as received at one or more receiver devices; triangulating locations of the parts in work areas of the facility based on the signal strengths of the location signals; and transmitting indications of the work areas in which the parts are located. Tracking parts in such a manner provides real-time knowledge of the parts in the manufacturing facility that can be used to clear up inefficiencies, forecast order completions, track worker productivity, and generally organize the manufacturing or servicing facility.

Another embodiment is directed to a method for tracking parts in a facility. The method includes: receiving location signals of a wireless beacon coupled to a part in facility; receiving receiver device identifiers corresponding to receiver devices in the manufacturing or service facility that received the location signals; generating a mapping of work areas and sub-work areas in the facility; associating receiver devices in the facility to one or more of the work areas and sub-work areas; identifying a location of the wireless beacon and corresponding part in the facility based on the location signals, the receiver device identifiers, and the mapping; and storing the location of the part. Tracking parts in such a manner provides real-time knowledge of the parts in the manufacturing facility that can be used to clear up inefficiencies, forecast order completions, track worker productivity, and generally organize the manufacturing or servicing facility.

In one embodiment, the location of the wireless beacon includes at least one of the work areas or the sub-work areas.

In one embodiment, the location signals include sensor data captured by the wireless beacon, and the work area is determined based, in part, on the sensor data.

The aforesaid embodiments are described in more detail below, as are additional or alternative embodiments.

DESCRIPTION OF DRAWINGS

The accompanying drawings facilitate an understanding of the various embodiments.

DETAILED DESCRIPTION

Figure 1:
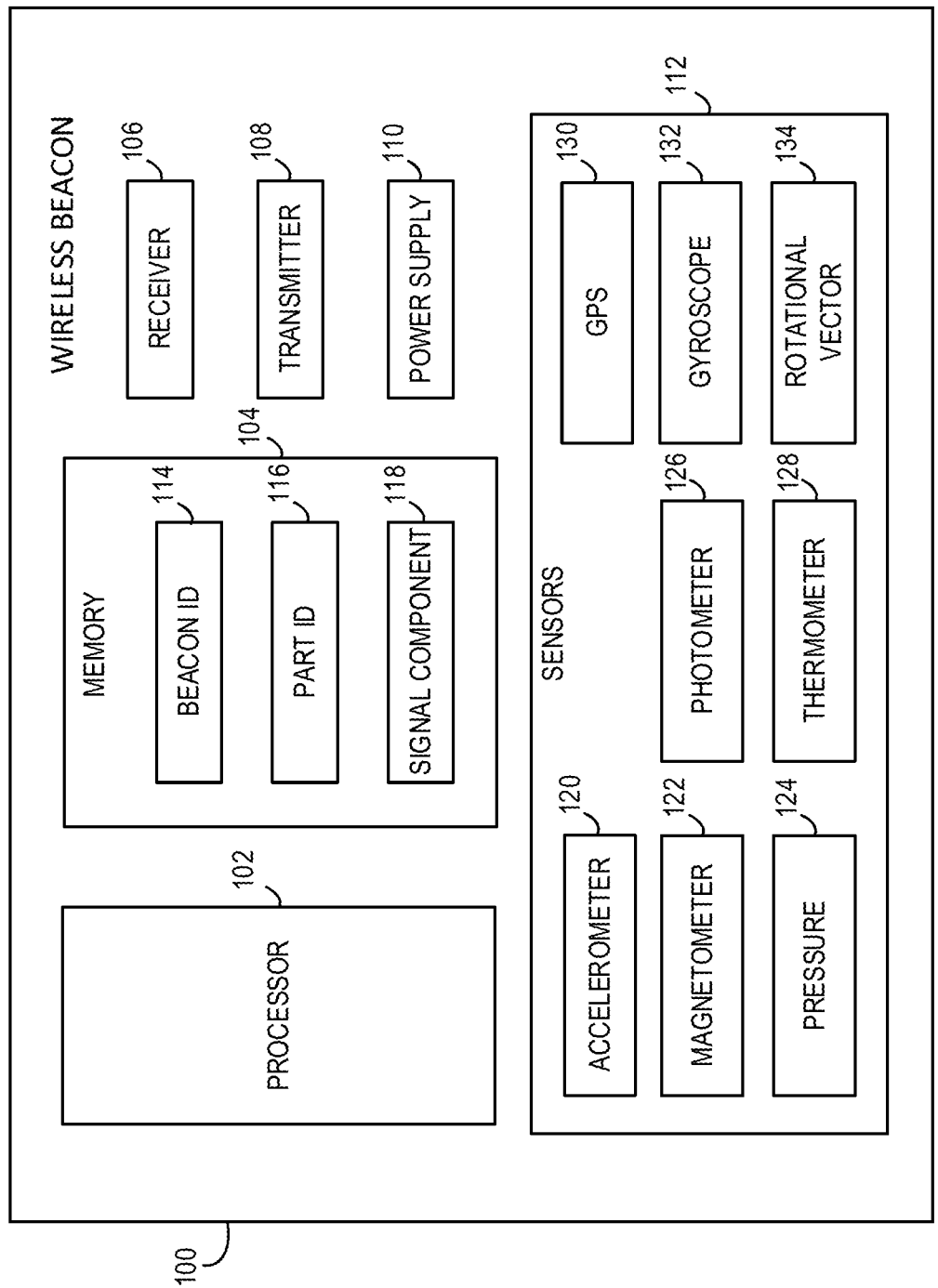
FIG. 1 illustrates a block diagram of a wireless beacon for implementing some of the disclosed embodiments.

Embodiments disclosed herein generally relate to systems, methods, devices, and computer storage media for tracking parts throughout manufacturing or service facilities. The parts themselves are equipped with wireless beacons that transmit location signals as the parts move through a facility. Receiver devices are strategically positioned throughout the facility and operate to wirelessly receive the location signals from the beacons and transmit the received location signals over a network (e.g., the Internet or private network) to a server or other computing device.

In one embodiment, the server determines the real-time location of the parts in the facility using the location signals captured by the receiver devices in the facility. Parts may be mapped to particular areas and/or sub-work areas in the facility using the location signals of the beacons and/or the identification of the receiver devices capturing the location signals. As the parts move throughout the facility, subsequently submitted location signals of the parts' coupled wireless beacons can be captured by the receiver devices and analyzed to decipher where the parts are located.

Additionally, the historical locations of parts may be stored and analyzed to better understand the operational inefficiencies of a manufacturing or service facility or to ascertain inefficiencies of individual workers. Some embodiments integrate the systems and techniques described herein with their electronic staffing record systems to determine how efficiently specialized workers are performing job tasks. For example, the number of parts still needing to pass through various work areas may be used to forecast shipment completion dates, current work capacities, staffing productivity, and/or staffing needs. Or, in another example, the amount of time parts stays in a welding working area may be tracked and associated with the welder on staff's overall efficiency at welding a particular part.

The embodiments discussed herein may be implemented in various manufacturing, service, wholesale, and retail facilities. A manufacturing facility may use the various embodiments herein to track parts being assembled therein. A service facility may use embodiments disclosed herein to track parts being fixed, inspected, or otherwise serviced. Retail facilities may use the disclosed embodiments to track goods being stored or displayed. For the sake of clarity, instead of having to constantly mention all of the possible facilities throughout this disclosure, embodiments are discussed in a manufacturing facility to aid the reader with the understanding that such embodiments may equally be used in other types of facilities as well. Thus, the embodiments disclosed in a manufacturing facility may be used in a servicing facility, retail facility, wholesale facility, or other facility.

The manufacturing facilities discussed herein have separate work areas, and each work area may include one or more sub-work areas. As referred to herein, a "work area" is an area in a manufacturing facility in which a particular work operation is performed. Examples of work areas include, without limitation, an intake area, a welding area, a machining area, an assembly area, a curing area, a painting area, a molding area, a programming area, a testing area, an inspection area, a shipping area, or any other area used to manufacture a completed part.

Work areas themselves may include one or more sub-work areas. For example, a welding area may include a holding sub-work area where parts needing to be welded are held, a welding sub-work area where welding is performed, an inspection sub-work area where welds are inspected, and an outtake sub-work area where welded parts are placed before moving to other areas. In another example, an assembly work area may include intake and outtake sub-work areas and several assembly sub-work areas where parts are attached along a manufacturing line. For instance, a first rotor may be moved to a first assembly sub-work area, the rotor is later fastened to a stator in a second assembly sub-work area, a second rotor is moved to a third sub-work area, and so forth. Additional examples of work areas and sub-work areas are too numerous to list here, and need not be exhaustively provided to understand the various embodiments disclosed. But it should at least be noted that embodiments may monitor the sub-work areas and the work areas to understand when parts are moving in and out of both.

Some of the embodiments disclosed herein track parts in a facility by their real-time locations in the various work areas and/or sub-work areas of a manufacturing facility. Additionally or alternatively, the historic locations of parts in various work areas and sub-work areas of a manufacturing facility may also be tracked. For example, one embodiment may track every work area and sub-work area through which a part has passed, and this historical location data about the part may be analyzed to determine specific bottlenecks in the manufacturing process, estimate delivery times of orders, forecast facility capacity, or determine other useful metrics related to the manufacturing or servicing facility.

Work areas and sub-work areas may all be contained within one facility (in some embodiments) or may be contained within multiple structures (in other embodiments). Even when contained in a single facility, the work areas may be included on different floors, in different rooms, or in various separated areas of the structures. For example, welding and assembly of parts may take place on a large shop floor. Whereas, parts may be received at an intake area in a separate room of the facility, or in an entirely other building structure of the facility. In another example that tracks parts across multiple structures, assembly and welding of a part may occur in a facility in Fort Worth, Tex., but the part may be programmed in another facility in Ipswich, Mass. The tracking techniques used herein may be configured to monitor the part in both facilities. Thus, embodiments disclosed herein may be used to track parts through a single structure, at different structures, or through separate rooms and floors of structures.

Locations of parts tracked throughout the facility using the techniques, systems, methods, and computer-storage disclosed herein may be displayed in UIs disclosed in the provisional patent application concurrently filed on Aug. 7, 2015, entitled "PRESENTATION OF REAL-TIME LOCATIONS OF PARTS IN A MANUFACTURING OR SERVICE FACILITY," filed by the Applicant, and having the same one inventor in common with this application. Additionally, some embodiments may use attached location tags to determine locations of parts, as disclosed the provisional patent application concurrently filed on Aug. 7, 2015, entitled "MONITORING PARTS IN A FACILITY," filed by the Applicant, and having one joint inventor in common with this application. Both concurrently filed provisional applications are incorporated herein by reference in their entirety for all purposes and are referenced herein collectively as the "Concurrently Filed Applications."

Any part in a manufacturing, service, wholesale, or service facility may be tracked using the various techniques and devices disclosed herein. Some specific embodiments focus on the tracking of parts in the oil-and-gas, power, mineral-extraction, and similar industries of manufacturing. Example parts that may be tracked in a manufacturing facility using the embodiments disclosed herein include, without limitation: fluid ends, swivels, joints, manifold trailers, safety iron, safety hammers, dart valves, plug valves, clapper check valves, pressure relief valves, emergency unloading valves, gate valves, subsea dosage valves, hydraulic valves, valve seats, butterfly valves, steadseal valves, hyperseal valves, Polytetrafluoroethylene-lined valves, swingthrough valves, rubber-sealing and rubber-line valves, fire safe valves, swing and lift check valves, T-pattern globe valves, Y-pattern globe valves, three-way globe valves, compressor check valves, cold reheat check valves, cold heat check valves, testable check valves, reverse current valves, parallel slide valves, gate valves, safety valves, safety relief valves, isolation valves, relief valves, mounted-ball valves, ball valves, diaphragm valves, triple offset butterfly valve, gate and globe valves, check valves, lift check valves, swing check valves, steam isolation valves, feedwater isolation valves, integrated safety valves, single-stage turbines, multi-stage turbines, hydraulic turbines, pump turbines, quad-runner turbines, gear operators, pneumatic actuators, pressure control panels, lifting clamps, flow line safety restraints, chokes, drop ball injectors, pumps, blowout preventers, gas separators, overshot connectors, wellheads, frac pumps, manifold systems, fluid end systems, slurry pumps, water pumps, subsea pumps, premix tanks, frac trees, swellable packers, manifold skids, tubing heads, wellheads, rod rotators, stuffing boxes, casing heads, tubing heads, control valves, and any other additional manufactured or serviced parts. While such a list is lengthy, it is not exhaustive. Other parts in manufacturing facilities may alternatively be tracked using the embodiments disclosed herein.

To aid the reader, a running example is discussed throughout this disclosure of wireless beacons being coupled to a "valve body," which is one constituent part of a valve that, when combined with other constituent valve parts (e.g., a disc, a hand wheel, an actuator, etc.) forms an assembled valve. Other parts—including those previously stated, equivalents thereof, or other manufactured or serviced parts—may be tracked in a manufacturing facility using the systems and techniques described herein. For the sake of clarity, however, the exemplary valve body is referred to throughout this disclosure as a "part" to further illuminate some of the disclosed embodiments.

Embodiments disclosed herein may generally be described in the context of computer-executable instructions, such as program modules, executed by one or more computing devices in software, firmware, hardware, or a combination thereof. The computer-executable instructions may be organized into one or more computer-executable components or modules. Generally, program components and modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. Moreover, in examples involving a general-purpose computer, aspects of the disclosure transform the general-purpose computer into a special-purpose computing device when configured to execute the instructions described herein.

Having briefly described an overview of some of the disclosed embodiments and generally defined various terminology used throughout this disclosure, the accompanying figures and corresponding disclosure below describe additional aspects of some of the embodiments disclosed herein. The following figures are provided merely to illustrate aspects of some of the disclosed embodiments and are not meant to limit all embodiments to any particular configuration of sequence of steps. Also, technically equivalent configurations, facilities, and work flows will be readily apparent to those skilled in the art in light of this disclosure. Such equivalent designs are fully contemplated by this disclosure.

FIG. 1 illustrates a block diagram of a wireless beacon 100, according to one embodiment. The wireless beacon 100 includes a processor 102, memory 104, a receiver 106, a transmitter 108, a power supply 110, and one or more sensors 112 that collectively function to transmit wireless location signals for use in identifying a particular part's location. The illustrated components of wireless beacons 100 may be encapsulated in a casing made of plastic, rubber, metal, or other type of material that protects the electronic components of the wireless beacon 100 from damage inside the manufacturing facility. Although the various blocks of FIG. 1 are shown with lines for the sake of clarity, in reality, delineating various components is not so clear, and metaphorically, the lines would more accurately be blurry. For example, processor 102 may have internal memory. The inventor hereof recognizes that such is the nature of the art and reiterates that the diagram of FIG. 1 is merely illustrative of an exemplary wireless beacon that can be used in connection with one or more of the disclosed embodiments. Moreover, alternative embodiments may include additional components or may not include some of the illustrated components, and equivalents of the various components will be readily apparent to those of skill in the art.

Processor 102 may include one or more microprocessors, microcontrollers, arithmetic logic units (ALUs), integrated circuits (ICs), application-specific ICs (ASICs) or chips, systems on chip (SoC), or other processing units configured to instruct transmission of wireless location signals according to the techniques and methods disclosed herein. In one embodiment, processor 102 comprises a Bluetooth-branded chip or circuit (e.g., a Bluetooth low energy (LE) or other Bluetooth Smart version chip) capable of selectively broadcasting low-powered wireless signals based on data detected by various sensors 112.

The wireless beacon 100 transmits location signals to receiver devices using the transmitter 108. In one embodiment, the transmitter 108 comprises a Bluetooth-branded transmitter capable of transmitting controlled-range wireless transmissions. Such Bluetooth transmitter may specifically use a Bluetooth LE (e.g., Bluetooth version 4.x) or a Bluetooth Smart transmitter capable of transmitting wireless signals at further piconet distances and at lower peak, average, and idle mode power consumption than legacy Bluetooth transmitters. Other embodiments may use legacy Bluetooth transmitters (e.g., Bluetooth versions 1.x, 2.x, 3.x, etc.).

When using Bluetooth for wireless transmissions, transmitter 108 may use a Bluetooth antenna to transmit location signals, or other messages, on a radio channel that regularly changes frequency (i.e., hops) according to a predetermined code. For example, transmitter 108 may include a Bluetooth transmitter that transmits in the unlicensed industrial, scientific, and medical (ISM) band at or about at 2.4 to 2.485 GHz, using a spread spectrum, frequency-hopping, full-duplex signal at a nominal rate of or about 1600 hops/sec. Frequency hopping may occur across about 79 frequencies at or about at 1 MHz intervals, in some embodiments. Other embodiments may use various other adaptive frequency hopping (AFH) techniques.

Receiver devices, which are discussed in more detail below, may be configured to receive signals along the same frequencies as those used by the transmitter 108. For example, a receiver device may tune to the same transmission frequencies and hopping schemes being used by the transmitter 108, enabling the receiver device to listen to the appropriate frequency at the appropriate time to receive data packets of location signals.

In other embodiments, the transmitter 108 comprises a Zigbee-branded transmitter to wirelessly transmit location signals to receiver devices. In such embodiments, the transmitter 108 operates on the physical radio specification of the Institute of Electrical and Electronics Engineers (IEEE) 802.15.4 standard and transmits in the unlicensed bands at or about at 2.4 GHz, 900 MHz, and 868 MHz. In other embodiments, the transmitter 108 wirelessly transmits location signals according to the IEEE 802.11 Wi-Fi standard. In such embodiments, the transmitter 108 operates on or about on the 2.4 GHz or 5 GHz ISM radio frequency bands. The transmitter 108 may alternatively be configured to transmit location signals using various other wireless protocols, e.g., without limitation, WirelessHD, WiGig, Z-Wave, and the like. Receiver devices may be tuned accordingly to listen for data packets along corresponding frequency bands used by the aforesaid communications protocols.

Additionally or alternatively, transmitter 108 may take the form of active or semi-passive radio frequency identification (RFID) transmitters, in some embodiments. Using active or semi-active RFID transmitters, transmitter 108 may wirelessly broadcast at a variety of frequencies, e.g., without limitation, at low frequency bands of or about 125/135 kHz, relatively high frequency bands (when compared to the low frequency band) of or about 13.56 MHz, and relatively ultra-high frequency bands (when compared to the low and high frequency bands) of or about 850-950 MHz. Receiver devices may be tuned accordingly to listen for data packets along corresponding frequency bands used by the aforesaid communications protocols.

The receiver 106 is capable of receiving data, either wirelessly through any of the aforementioned wireless communication protocols or through a wired connection. In one embodiment, the receiver 106 receives a part identifier (ID) 116 for the part coupled to the wireless beacon 100, allowing the wireless beacon 100 to locally store the part ID 116 in memory 104. Locally storing the part identifier (ID) 116 in memory 104 allows the wireless beacon to include the part identifier in location signals that are wirelessly transmitted to receiver devices. Not all embodiments will communicate part identifiers 116 in location signals, however. Some embodiments will instead broadcast location signals that include a standard data value or code word, an identifier of the wireless beacon (beacon ID 114) stored in memory 104, or a combination thereof—either with or without the part (ID) identifier 116.

In one embodiment, wireless beacon 100 is programmed with the part ID 116 at a programming work station in the facility. Parts may be paired with wireless beacons using programming devices that communicate the part IDs 116 to the wireless beacons 100 for storage thereon. When the part leaves the facility, the wireless beacon 100 may be removed from the part and returned to a storage container until the wireless beacon is paired again with another part by being programmed with that part's part ID 116. In this sense, the wireless beacons 100 are reusable and can be repeatedly be used to track different parts coming through the facility.

Wireless beacon 100 includes a variety of computer-readable media, which are represented in FIG. 1 as memory 104. Computer-readable media include computer-storage media and communication media. By way of example, and not limitation, computer-storage media may comprise Random Access Memory (RAM); Read Only Memory (ROM); Electronically Erasable Programmable Read Only Memory (EEPROM); flash memory or other memory technologies; solid-state memory; hard drives; compact disks (CDs); digital versatile disks (DVDs) and other optical or holographic media; magnetic cassettes, magnetic tape, magnetic disk storage or other magnetic storage devices; or any other media that can be used to encode desired information and be accessed by wireless beacon 100.

Computer-storage media may include volatile, nonvolatile, removable, and non-removable media implemented in any method or technology for storage of information including, without limitation, computer-readable instructions, data structures, program modules, data types, dynamic link libraries (DLLs), application programming interfaces (APIs), or other data. Computer-storage media are tangible, mutually exclusive to communication media, and exclude carrier waves and propagated signals. For purposes of this disclosure, computer-storage media are not signals per se. In contrast, communication media typically embody computer-readable instructions, data structures, program modules, or other data in a modulated data signal such as a carrier wave or other transport mechanism and include any information delivery media.

Memory 104 represents computer-storage media on the wireless beacon 100. In operation, the processor 102 reads data and/or executes computer-executable instructions stored in memory 112. Memory 104 may also store a beacon identifier (ID) 114 indicative of the wireless beacon 100 and a part ID 116 indicative of the part to which the wireless beacon 100 is attached, affixed, paired, or otherwise coupled. The beacon ID 114 is a unique alphanumeric value, e.g., a codeword, beacon number, a media access control address (MAC), or other type of identifier unique to the wireless beacon 100. The part ID 116 is also a unique alphanumeric value that may include a part number, PO number, customer identifier, shipping number, part description, MAC address, or other type of identification of the coupled part.

Memory 104 stores a signal component 118 that comprises executable instructions dictating when to transmit location signals from the wireless beacons 100 using the transmitter 108. In one embodiment, signal component 118 selectively instructs the processor 102 to transmit location signals upon detected incidents or events, as sensed by one or more hardware or software sensors 112 on the wireless beacon 100. In another embodiment, signal component 118 instructs the processor 102 to periodically transmit location signals at specific time periods (e.g., 25 milliseconds, 30 seconds, 5 minutes, 1 hour, etc); at certain times of the day (8:00 am, noon, 2:00 pm, etc.); on particular days (e.g., Monday, Thursday, etc.); or a combination thereof. In still another embodiment, the wireless beacon 100 may be equipped with a user-interface (e.g., physical button, keypad, etc., joystick, etc.) that allows a user to prompt the transmission of location signals. For instance, a detected specific user interaction (e.g., pushing of a button) by the signal component 118 prompts transmission of location signals. The signal component 118 may be configured to transmit location signals based on input from any of the illustrated sensors 112 or from a combination of signals from the sensors 112. Along these lines, some embodiments may only include one or some combination of the illustrated sensors 112.

Sensors may include an accelerometer 120, a magnetometer 122, a pressure sensor 124, a photometer 126, a thermometer 128, a GPS sensor 130, a gyroscope 132, a rotational vector sensor 134, additional sensors, or a combination thereof. Some of the sensors 112 may be combined into a single sensor chip. For example, the accelerometer 120 may be combined with the magnetometer 122, the pressure sensor 124 may be combined with the thermometer 128, the gyroscope 132 may be combined with the rotational vector 134, etc. Predicating location-signal transmissions on the sensed inputs can drastically reduce overall power consumption because the wireless beacons 100 only transmit signals—and thus wake up—at particular detected events. In such embodiments, an operating system of the wireless beacon is kept inactive (i.e., sleeps) until a sensor detects a particular threshold event (e.g., movement, acceleration, temperature, light, pressure, rotation, GPS, etc.), at which time the operating system is woken up and location signals are transmitted. This saves considerable battery power in the wireless beacons 100.

Looking at the sensors 112 depicted, the accelerometer 120 captures the acceleration force of the wireless beacon 100 in the x, y, and/or z directions. In one embodiment, signal component 118 is configured to transmit location signals upon the detection of any sensed acceleration. Transmitting in such a manner may consume significant power resources, however, because the wireless beacon 100 and its coupled part may be stored in a container that is frequently jostled, bumped into, or otherwise moved at times when the part is not being transferred throughout the manufacturing facility. Therefore, some embodiments will wait until the accelerometer 120 measures a certain threshold of acceleration or movement before transmitting the location signals. For example, movement of 1 ft/s$^2$ or 0.3 m/s$^2$ may need to be reached before the signal component 118 instructs location signals to be transmitted.

Additionally, the direction of acceleration or movement detected by the accelerometer 120 may also be taken into account by the signal component 118 when determining when to transmit location signals. Acceleration or movement in one or more directions (e.g., x, y, or z direction, or a combination thereof) may be weighted by the signal component 118 in order to give more or less deference to a particular direction, or directions, as conditions used to base transmissions of location signals. For example, acceleration in the z direction may be weighted differently than acceleration in the x or y directions, because the z direction may be more likely to indicate that a part is being lifted out of a bin in one work area or sub-work area and will likely be transferred to another. In another example, movement in the z direction may be discounted when compared to movement in the x and y directions, as movement up and down may likely be inconsequential as an indicator of whether a part is moving to a different work area or sub-work area. Any of the directions (x, y, or z) may be weighted account for different parts, movements, or facilities.

The magnetometer 122 may take the form of a low-powered vector or total-field magnetic sensor capable of detecting magnetic fields either in aggregate or in two or three dimensions. Examples of magnetic sensors that may be used include, without limitation, a Hall effect sensor, a giant magnetoresistance (GMR) sensor, a magnetic tunneling junction (MTJ) sensor, an anisotropic magnetoresistance (AMR) sensor, and a Lorentz force sensor. In operation, the signal component 118 may be configured to transmit location signals when the magnetometer 122 senses a threshold magnetic field, either in the aggregate or in particular directions, thereby indicating the wireless beacon 100 is within a particular proximity (e.g., 0.5, 1, 3, etc. feet or meters) to a specific magnetic structure (e.g., metallic beam) or electromagnetic device (e.g., receiver device).

The threshold level of sensed magnetism necessary for the signal component 118 to transmit location signals may be correlated to the distance such structures or receiver devices are from the wireless beacon 100. For example, the signal component 118 may only transmit location signals when a field of more than 4 Gauss is sensed, because a 4 Gauss field correlates from a particular distance of a specific structure or device in the manufacturing facility. Alternatively, to avoid false positives when the part is moving, a time element may be factored when using readings from the magnetometer 122 such that a threshold level of magnetism must be detected for threshold period of time (e.g., 5 seconds, 1 minute, 1 hour, etc.) to trigger the transmission of location signals.

The pressure sensor 124 detects pressures, and the thermometer 128 detects temperature. In particular, the pressure sensor 124 may take the form of a transducer, a capacitance-type sensor, micromachine silicon (MMS) sensor, micro-electromechanical system (MEMS) sensor, a chemical vapor deposition (CVD) sensor, or other type of sensor capable of detecting pressure. Pressure and temperature may differ in various work and sub-work areas. For instance, welding and curing work areas may be relatively hotter than assembly areas. So the signal component 118 may be configured to transmit location signals based on sensed temperature and/or pressure being or temperature/pressure changes.

A photometer 126 may be used to detect light intensity or other optics. Photometer 126 may include one or more photoresistors, photodiodes, photomultipliers, or other types photo-voltaic components capable of measuring one or more light properties, including, for example but without limitation: light illuminance, irradiance, absorption, scattering, reflection, fluorescence, phosphorescence, luminescence. In one embodiment, the signal component 118 transmits location signals based on one or more detected light properties. In one specific embodiment, different light sources or signs having particular light reflective properties may be positioned throughout the manufacturing facility in an attempt to delineate different work or sub-work areas. The photometer 126 may be configured to continually or periodically detect light properties, and provide detected light properties to the signal component 118 for evaluation.

A GPS sensor 130 may be used to detect the location and movement of the wireless beacon 100. The GPS sensor 130 may include its own integrated antenna along with various filters, radio frequency shields, and internal processor. In operation, the GPS sensor 130 detects x and y coordinates, and the signal component 118 can, in turn, use such coordinates to locate and track movement of the wireless beacon 100.

A gyroscope 132 may be used to detect movement through gyroscopic rotation (e.g., roll, pitch, and yaw) and the speed of movement. The gyroscope 132 may work alone or in conjunction with the accelerometer 120 to determine the acceleration or speed of movement of the wireless beacon 100. Acceleration and speed of movement may be considered by the signal component 118 when determining when to transmit location signals.

The orientation and location of the wireless beacon 100 may alternatively or additionally be sensed using a rotational vector sensor 134. The rotational vector sensor 134 may be configured to detect rotational vector components along the x, y, and/or z axes, calculating the orientation of the wireless beacon 100 as a combination of an angle (θ) around an axis (x, y, z). For example, the rotational vector components may be calculated in the following manner:

$$\text{Vector}(x)=x*\sin(\theta/2)$$

$$\text{Vector}(y)=y*\sin(\theta/2)$$

$$\text{Vector}(z)=z*\sin(\theta/2)$$

Where the magnitude of the rotation vector is equal to sin(θ/2), and the direction of the rotation vector is equal to the direction of the axis of rotation. These three vector components may be used by the rotational vector sensor 134 to determine the orientation and location of the wireless beacon 100, and the signal component 118 may use the determined orientation and location of the wireless beacon 100 to determine when to transmit location signals.

In one embodiment, the signal component 118, when executed by the processor 102, additionally or alternatively adds sensor data to the location signals that are wirelessly broadcast. For example, direction or acceleration information from the accelerometer 120, magnetic field data from the magnetometer 122, pressure readings from the pressure sensor 124, light data from the photometer 126, temperature readings from the thermometer 128, GPS coordinates from the GPS sensor 130, gyroscopic rotation from the gyroscope 132, and rotational vector magnitudes from the rotational vector sensor 134 may be included in the location signals from the wireless beacon 100. The wireless beacon 100 may transmit various sensor data—either collected at the time the wireless beacon 100 is woken up, historically, or periodically—along with the beacon ID 114, part ID 116, or a combination thereof to the receiver devices discussed below.

The power supply 110 may take the form of a battery, which is either rechargeable or not. Some embodiments may include power monitoring circuitry or software that, when executed by the processor 102, determines the power level of the power supply. Indications of such power levels may be wirelessly communicated from the transmitter 108 using any of the aforementioned wireless communication protocols and techniques to either a receiver device, a client computing device, or a server.

To preserve power supply 110, embodiments may selectively transmit location signals from the wireless beacon 100 only when certain events are detected by one or more sensors 112. Embodiments may include only one of the illustrate sensors 120-134 or a combination thereof. Location signals may be transmitted either synchronously according to an internal clock (e.g., at a time frequency of or about 60 Hz) or asynchronously.

Figure 2A:
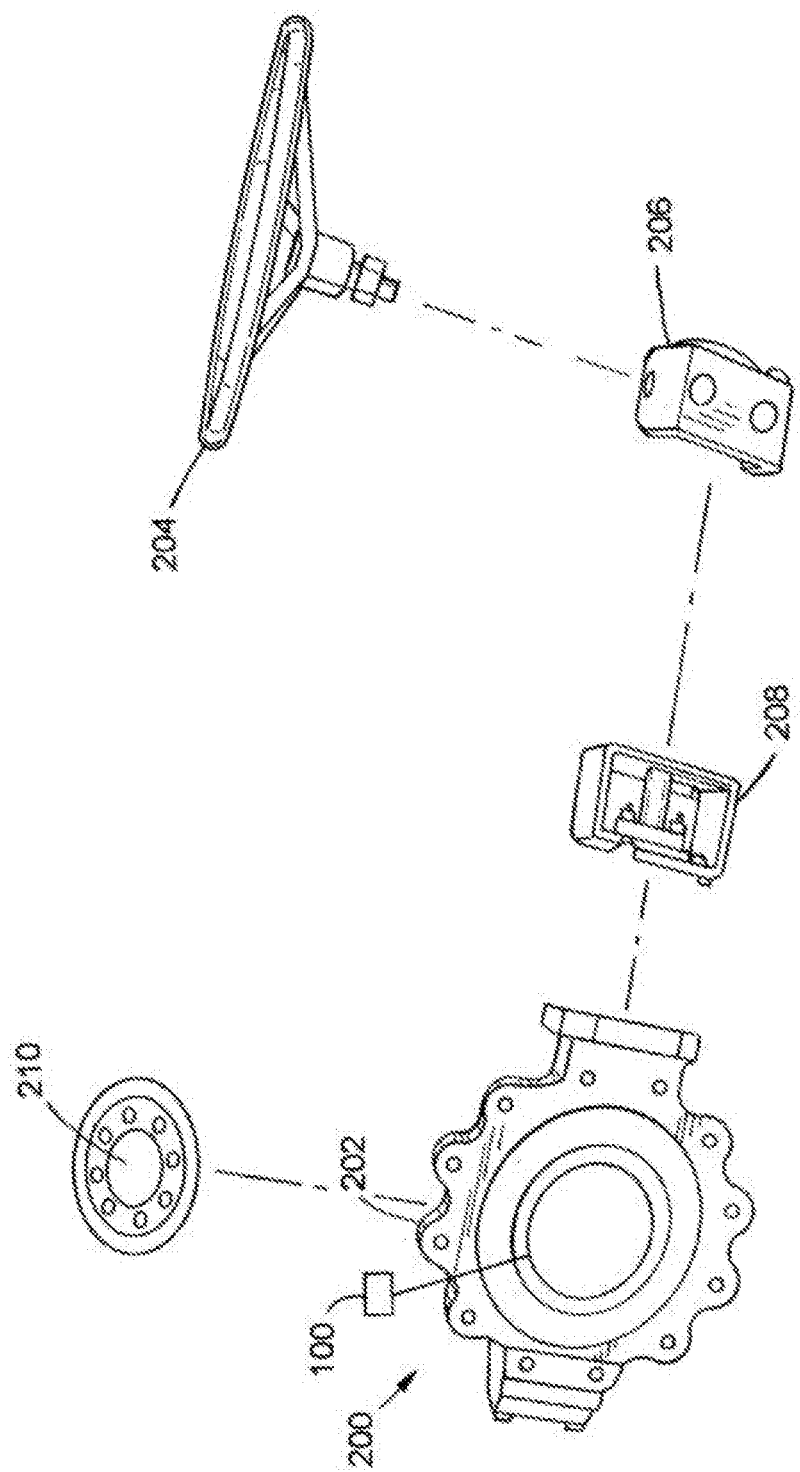
FIG. 2A is an exploded-view diagram of a valve with a wireless beacon coupled to one of the valve's constituent parts for implementing some of the disclosed embodiments.

FIG. 2A is an exploded-view diagram of a valve 200 with a wireless beacon 100 coupled to one of the valve's constituent parts, according to one embodiment. Valve 200 comprises a valve body 202, a hand wheel 204, an actuator 206, a shaft 208, and a valve disc 210. The valve body 202, hand wheel 204, actuator 206, shaft 208, and valve disc 210 are machined, welded, and assembled in a manufacturing facility into valve 200. The wireless beacon 100 may be coupled to the valve body 202 in any number of ways. For example, the wireless beacon 100 may be tied to the valve body 202; affixed with an adhesive; attached with bands (e.g., plastic, metallic, rubber, etc.), ties, ropes, strings, clasps, hooks, Velcro, magnets, clips, fasteners; placed in a container, bag, pocket, bin, or other receptacle that travels with the valve body 202 throughout the manufacturing facility; or otherwise coupled to the valve body 202.

Figure 2B:
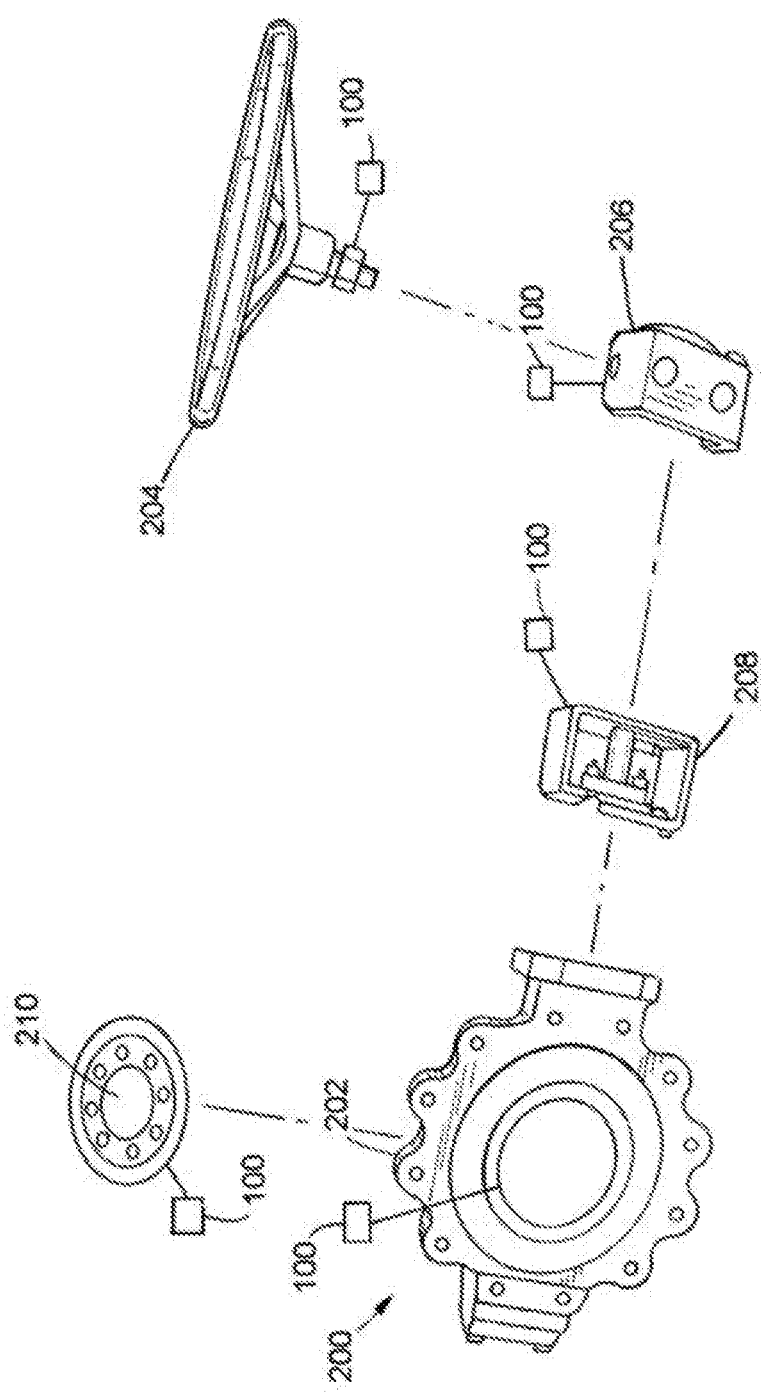
FIG. 2B is an exploded-view diagram of a valve body with wireless beacons coupled to multiple constituent parts for implementing some of the disclosed embodiments.

The illustrated valve 200 is only shown with one constituent part—the valve body 202—having a coupled wireless beacon 100. As shown in FIG. 2B, wireless beacons 100 may be coupled to all the constituent parts of the valve 200, i.e., the valve body 202, the hand wheel 204, the actuator 206, the shaft 208, the valve disc 210, or any particular constituent parts needing to be tracked.

Figure 3:
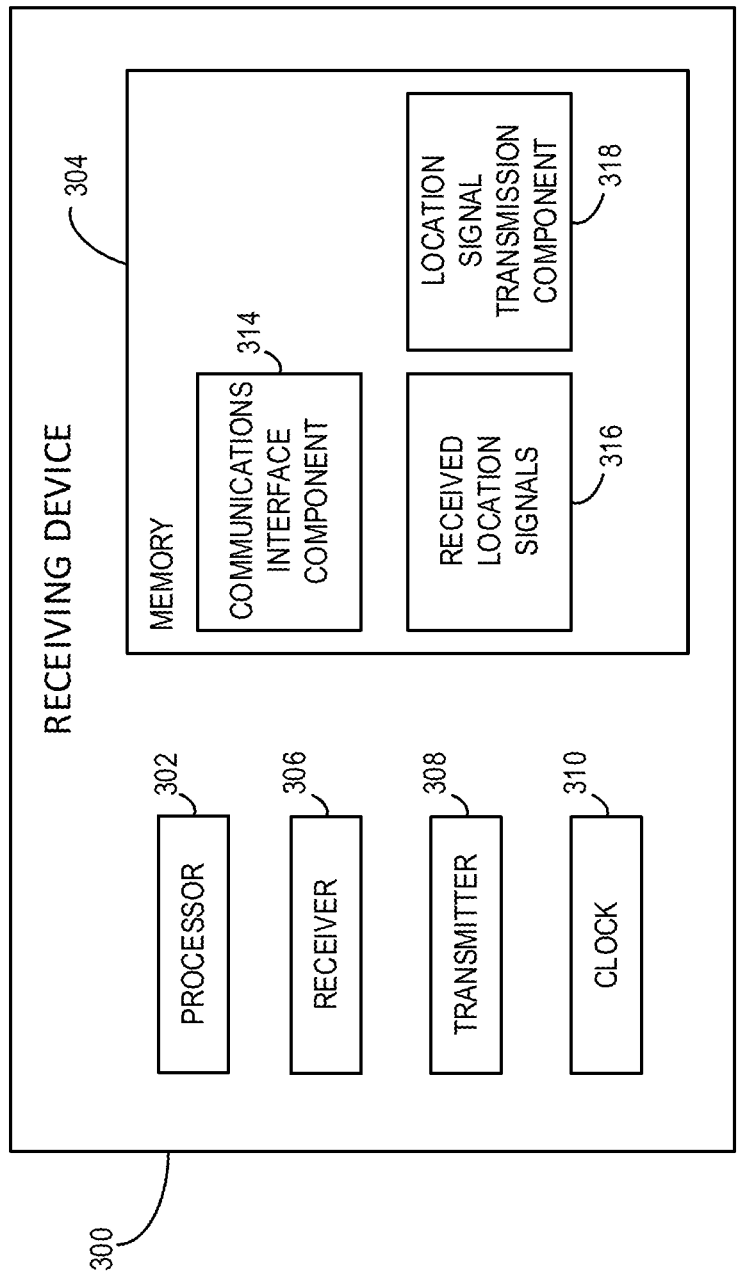
FIG. 3 illustrates a block diagram of a receiver device for implementing some of the disclosed embodiments.

FIG. 3 illustrates a block diagram of a receiver device 300, according to one embodiment. The receiver device 300 is capable of receiving location signals from the wireless beacons 100 and communicating the location signals through a network (e.g., the Internet or a virtual private network) to a server that determines the location of the wireless beacons 100 in the manufacturing facility. In the illustrated embodiment, the receiver device 300 includes a processor 302, memory 304, a receiver 306, a transmitter 308, and a clock 310. The receiver device 300 also stores in memory 304 computer-executable instructions and computer-readable data comprising a communications interface component 314, received location signals 316, and a location signal transmission component 318.

The receiver 306 may be any communications receiver capable of receiving wireless location signals from the wireless beacon 100 using any of the previously mentioned communication protocols. In one specific embodiment, the receiver 306 is a Bluetooth antenna, and location signals are communicated across a piconet established between the wireless beacons 100 and the receiver 306. In another embodiment that transmits location signals using RFID, the receiver 306 has an RFID-capable antenna and RFID reader module configured to capture data along specific frequency bands. In one embodiment, to receive information from transmitters 108 of the wireless beacons 100, the receiver 306 of the receiver device 300 employs the same hopping sequence used by the transmitters 108. When the frequency hopping sequences of transmitters 108 and the receivers 306 occur at or about the same time, location signals can transfer from the wireless beacons 100 to the receiver device 300, which stores the received location signals 316 in memory 304.

The transmitter 308 of the receiver device 300 operates to communicate information across a public network or a private network. The processor 302 may include any of the aforementioned processors, including, for example but without limitation, a microprocessor, a microcontroller, an ALU, an IC, an ASIC, an SoC, or the like. Clock 310 may be used to control synchronous tuning and hopping of the receiver 306 across various radio frequencies in order to receive location signals from the wireless beacons 100 according to a particular protocol (e.g., Bluetooth LE). Clock 310 may be either separate from or internal to the processor 302 or the receiver 306, and may be set at a particular frequency or variable.

Memory 304 represents computer-storage media, as referred to above, capable of storing and manipulating a communications interface component 314, received location signals 316, and a location signal transmission component 318. In some embodiments, the communications interface component 314 includes a network interface card and/or computer-executable instructions (e.g., a driver) for operating the network interface card. Communication between the receiver device 300 and remote computing devices (e.g., a server, laptop, smart phone, mobile tablet, television, projector, etc.) may occur using any protocol or mechanism over a wired or wireless connection. In some examples, the communications interface is operable with short range communication technologies, such as by using near-field communication (NFC) tags.

The location signal transmission component 318, when executed by the processor 302, initiates transmission of stored location signals to remote computing devices across a public or private network using transmitter 308. The location signal transmission component 308 may use an application-layer transfer protocol (e.g., the hypertext transfer protocol (HTTP), file transfer protocol (FTP), or the like) to communicate the received location signals 316 to the remote computing device. In one embodiment, the location signal transmission component 308 periodically aggregates the received location signals 316 into a data file (e.g., an extensible markup language (XML) file) and communicates the data file to the remote computing device using the transmitter 308. Alternatively, the location signal transmission component 308 may communicate location signals upon receipt from the wireless beacons 100.

The receiver device 300 may communicate various data specific to the received location signals 316 to the remote computing device. Examples of such data include, without limitation, data elements related the wireless beacons 100 (e.g., beacon ID 114); the parts associated therewith (e.g., part ID 116); the sensors 112 (e.g., x, y, or z coordinates and magnetic flux reading); signal strength of the location signals received by the receiver device 300; and/or the time, date, frequency associated with location signal transmissions from the wireless beacons 100 to the receiver device 300. In one embodiment, the signal strength may be communicated as a measure of Decibel-milliwatts (dBmW) indicative of the power of the location signals upon receipt by the receiver device 300. Additionally or alternatively, the receiver device 300 may be programmed with a unique identifier (referred to herein as the "receiver device ID") that may also be communicated to the remote computing devices, including the monitoring servers disclosed herein, to indicate which receiver device received the location signals at particular signal strengths. Table 1 below provides exemplary data attributes that may be communicated by the receiver device 300 to remote computing devices or monitoring servers:

TABLE 1

| Date | Time | Signal Strength | Beacon ID | Part ID | Receiver Device ID |
|---|---|---|---|---|---|
| July 13, 2015 | 2:15:36 pm | 2.2 dBmW | MM:MM:MM:SS:SS:SS | 1234567890 | 10003 |
| July 13, 2015 | 2:15:37 pm | 0.5 dBmW | MM:MM:MM:SS:SS:SS | 1234567890 | 10001 |
| July 13, 2015 | 2:15:38 pm | 3.0 dBmW | MM:MM:MM:SS:SS:SS | 1234567890 | 10002 |
| July 13, 2015 | 2:25:39 pm | 7.3 dBmW | ZZ:YY:AA:BB:CC:DD | 4567890123 | 10001 |
| July 13, 2015 | 2:45:45 pm | 1.1 dBmW | AA:BB:CC:DD:EE:FF | 5678901234 | 10001 |

Knowing the signal strength of the location signals at the receiver devices 300 allows some embodiments to determine the closest receiver device 300 in the manufacturing facility to the wireless beacons 100 and coupled parts—for example, without limitation, using a triangulation technique described below in reference to FIG. 7. In some embodiments, the low-powered transmissions from the wireless beacons 100 dissipate over distance, allowing the monitoring server 400 to determine the distance the wireless beacons 100 are from the receiver devices to the strengths of location signals. For example, receiver devices 300 capturing location signals at lower strengths can be considered to be further away from broadcasting wireless beacons 100—and their coupled parts—than receiver devices capturing stronger locations signals.

Objects in the manufacturing facility may obstruct the wireless location signals from the wireless beacons 100. For example, a steel pillar or metallic piece of equipment in the facility may distort a wirelessly broadcast location signal. To counter location signal distortions, one embodiment may strategically place the receiver devices 300 in the manufacturing facility to account for the various objects in the facility. For example, a receiver device 300 behind a trash compactor may be positioned closer in front of the trash compactor facing the majority of work areas to ensure non-distorted receipt of location signals.

Some objects may be not be easily moved around; however, so other embodiments may adjust or weight the strength of the location signals received by some of the receiver devices 300 to account for the various objects. For example, location signals captured by a receiver device 300 near a stone pillar may be weighted by the monitoring server or computing devices discussed herein to boost the signal strength of the captured signal by particular increments (e.g., 2 dBmW, 10 dBmW, etc.) to reduce the distortion effect caused by the pillar. Alternatively or additionally, signal strengths of location signals captured by receiver devices 300 may be decremented (or incremented) by the monitoring server or computing device based on the other receiver devices 300 capturing the location signals. For example, if three receiver devices 300 capture a location signal for a wireless beacon 100 and two of the capturing receiver devices are not near obstructions in the manufacturing facility while one receiver device is near an iron obstruction, the signals at the two unobstructed receiver devices 300 may be decremented because of the presence of the third receiver device 300 to give an accurate comparison of which receiver device 300 is closest to the wireless beacon 100. Thus, signal strengths of the location signals themselves may be adjusted (either up or down) to account for various obstructions in the manufacturing facility or to equalize them with respect to the obstructions near other receiver devices 300.

Figure 4:
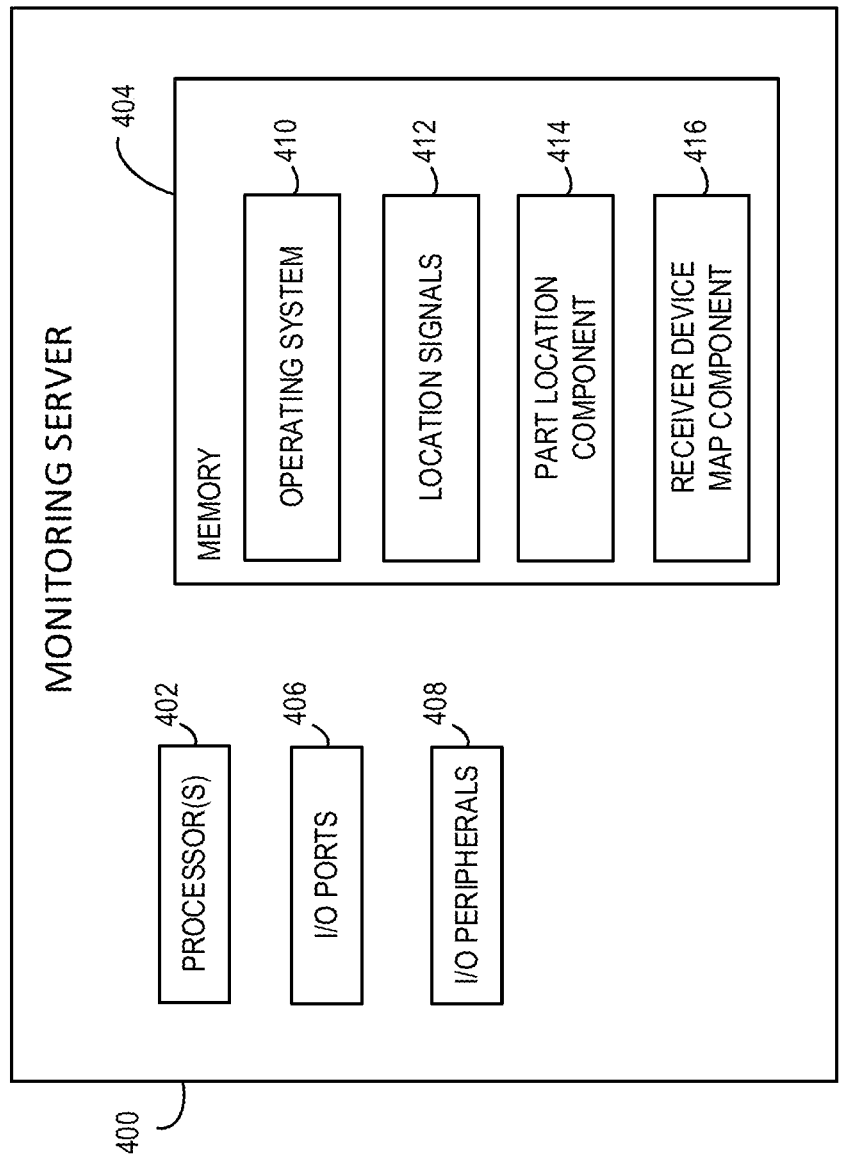
FIG. 4 illustrates a block diagram of a monitoring server for implementing some of the disclosed embodiments.

FIG. 4 illustrates a block diagram of one type of remote computing device (a monitoring server 400) according to one embodiment. The monitoring server 400 includes one or more processors 402, computer-storage memory 404, input/output (I/O) ports 406, and I/O peripherals 408. While the illustrated monitoring server 400 appears to be a single physical device, the shown embodiment may actually operate across a plurality of physical devices—e.g., multiple servers in a relational server configuration.

The processors 402 comprise one or more microprocessors, microcontrollers, graphic processing units (GPUs), ASICs, ICs, ALUs, or the like. I/O ports 406 allow computing device 400 to be logically coupled to various I/O peripherals 408. I/O peripherals 408 may include a host of different input and output presentation devices, including, for example without limitation, a display device (e.g., computer monitor, projector, touch screen display, virtual surface, etc.), speaker, printer, vibrating component, microphone, speaker, a microphone, a joystick, a satellite dish, a scanner, a remote control, a graphical user interface (GUI), wearable (e.g., watches, glasses, headsets, or earphones), or the like. In one particular embodiment, the I/O peripherals 408 include connectivity to a video projector or display monitor configured to present real-time information about the location of parts in the manufacturing facility, as determined by a part location component 414 upon analyzing location signals 412 received from the receiver devices 300.

In one embodiment, memory 404 stores computer-executable instructions comprising an operating system 410, the location signals 412 received from the receiver devices 300, the part location component 414, and a receiver device map component 416. The operating system 410 controls the software computational environment of the monitoring server 400. The location signals 412 are received from the receiver devices 300 and may include any of the aforementioned data transmitted from either the wireless beacons 100 and/or the receiver devices 300, e.g., part ID, beacon ID, time, date, MAC address, codeword, signal strength, receiver device ID, etc. In one embodiment, the part location component 414 determines the location of parts in the manufacturing facility based on the received location signals 412 and a map of the different work areas and/or sub-work areas in the manufacturing facility generated by the receiver device map component 416.

The receiver device map component 416 generates such a map of the various work areas and sub-work areas, in one embodiment, based on the strategic placement of the receiver devices 300 in the manufacturing facility. Receiver devices 300 may be placed in or within a certain proximity to the different work and sub-work areas, and each receiver device 300 can be assigned a particular work or sub-work area. For example, one receiver device 300 may be assigned to the holding sub-work area of a welding work area, another receiver device 300 may be assigned to a machining area's completed sub-work area, and a third receiver device 300 may be assigned to a shipping work area. Thus, users may define the various work and sub-work areas of the manufacturing facility through strategic placement of the receiver devices 300. Additionally or alternatively, the direction of the work area or sub-work area in relation to each other may also stored in the map by the receiver device map component 416. For example, the welding work area may be stored as being north or northeast of the shipping area.

The map maintained by the receiver device map component 416 may include an x/y coordinate mapping of the manufacturing facility with various portions assigned to different receiver devices 300 set up throughout the manufacturing facility. Receiver devices 300 may be assigned to the different portions of the x/y coordinate mapping. In one embodiment, receiver devices 300 are mapped to the x/y coordinates in a one-to-one manner, meaning that each coordinate may be assigned to just one receiver device 300. Alternative embodiments map x/y coordinates of the map on a one-to-many basis such that coordinates are assigned to more than one receiver device 300. Each receiver device 300 can then be assigned to a specific work area or sub-work area. For instance, considering the example illustrated in Table 1 above, the receiver device 300 with receiver device ID 10001 may be assigned to a welding work holding sub-work area, the receiver device 300 with receiver device ID 10002 may be assigned to a completed assembly sub-work area, and the receiver device 300 with receiver device ID 10003 may be assigned to a shipping work area.

In operation, the part location component 414 uses the location signals 412 to identify in real-time the work area and/or sub-work area in the manufacturing facility where the parts are located. To do so, the part location component 414 may determine the closest receiver devices 300 to the wireless beacons 100 and assign the parts associated with the wireless beacons 100 to work areas and/or sub-work associated with the nearest receiver devices 300—as identified by the x/y coordinate mapping maintained by the receiver device map component 416. The nearest receiver devices 300 may be identified by analyzing the strength of the location signals 412 for a particular wireless beacon 100 captured by multiple receiver devices 300 at or within a given time window (e.g., 30 ms, 1 s, 1 minute, etc.).

Multiple receiver devices 300 may capture location signals being broadcast by a wireless beacon 100. For example, considering Table 1 again, three of the receiver devices 300 identified by IDs 10003, 10001, 10002 captured location signals from the same wireless beacon 100 having beacon ID MM:MM:MM:SS:SS:SS at varied signal strengths 2.2 dBmW, 0.5 dBmW, and 3.0 dBmW, respectively. In one embodiment, the part location component 414 determines that the 10002 receiver device 300 is closest to the MM:MM:MM:SS:SS:SS wireless beacon 100 due to the relatively high signal strength of the location signal captured by the 10002 receiver device 300. Going a step further, the part location component 414 may then associate the MM:MM:MM:SS:SS:SS wireless beacon 100 as being located in a particular work area and/or sub-work area assigned to the 10002 receiver device 300 in the map of the different work areas and/or sub-work areas maintained by the receiver device map component 416.

In another embodiment, the part location component 414 uses the two, three, or more signal strengths to triangulate the location of the MM:MM:MM:SS:SS:SS wireless beacon 100 using, for example, the technique discussed below in reference to FIG. 7. Once the location is triangulated, the part location component 118 may identify the closest assigned receiver device 300 to the triangulated location of the MM:MM:MM:SS:SS:SS wireless beacon 100 and identify corresponding work areas and/or sub-work areas in the receiver device 300 map maintained by the receiver device map component 416.

Additionally, the part location component 414 may adjust the strengths of locations signals based on obstructions in the manufacturing facility. As mentioned above, location signals may be boosted or decremented in various embodiments by the part location component 414 to account for RF obstructions in the manufacturing facility. The part location component 414 may be configured to adjust signal strengths of location signals based on objects identified by workers (e.g., boosting/decrementing signals captured by a receiver device 300 near a facility pillar), distances accounted for through strategic placements of the receiver devices (e.g., boosting/decrementing signals received at a receiver device 300 strategically placed in front of a trash compactor by an adjusted amount of signal dissipation that would occur if the receiver device 300 captured location signals behind the trash compactor), the particular other receiver devices 300 capturing the location signal (e.g., boosting the location signals 10002 captured by receiver device 300 and decrementing the location signals captured by the 10003 receiver device 300 and the 10002 receiver device 300, because the latter two receiver devices 300 are positioned in wide open areas but the former is located near a heavy piece of equipment), or a combination thereof.

Also, in some embodiments, the location signals of the wireless beacons 100 include sensor data from the sensor(s) 112 of the wireless beacon 100. The part location component 414 may use the sensor data (or the absence of sensor data) in the location signals to determine the location in the facility of the wireless beacon 100—and its coupled part. For example, a particular temperature reading captured by the thermometer 128 may be used by the part location component 414 of the monitoring server 400 to determine that the wireless beacon 100 is in a welding work area. Acceleration or direction information from the accelerometer 120 in conjunction with the previous determined location of a part (or wireless beacon 100) may be used by the part location component 414 to determine that the part has moved to an adjacent work area (e.g., the part was previously in a welding work area and then moved in the direction of an assembly work area). Detected magnetic fields captured by the magnetometer 122 may indicate to the part location component 414 that the wireless beacon 100 is near a particularly large piece of machinery (e.g., a blast furnace) that has been identified to be in a particular work area (e.g., smelting work area). Thus, the data from the sensor(s) 112 in the location signals may be used to determine the real-time locations of the parts.

Figure 5:
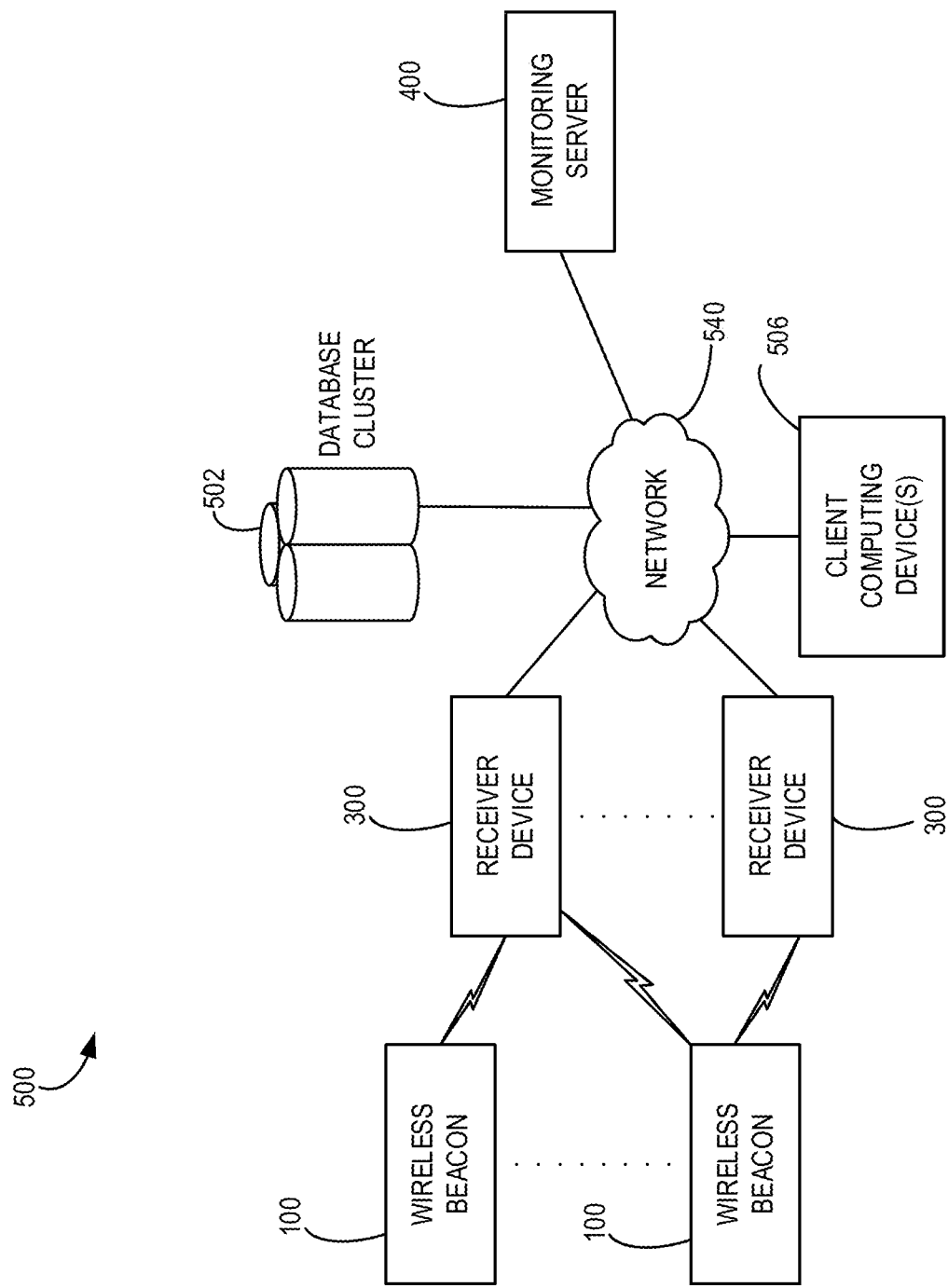
FIG. 5 is a block diagram of a networking environment for implementing some of the disclosed embodiments.

FIG. 5 is a block diagram of a networking environment 500 for implementing some of the disclosed embodiments. Networking environment 500 includes numerous wireless beacons 100 that wirelessly communicate (e.g., using Bluetooth LE) location signals to a multitude of receiver devices 300. Network environment 500 also includes a monitoring server 400, a database cluster 502, and one or more client computing devices 504 that, along with the receiver devices 300, communicate over a network 540.

The network 540 is a public or private computer network. Examples of such networks include, for example but without limitation, a local area network (LAN), a wide area network (WAN), or the like. When network 540 comprises a LAN networking environment, components may be connected to the LAN through a network interface or adaptor. When network 540 comprises a WAN networking environment, components may use a modem to establish communications over the WAN. The network 540 is not limited, however, to connections coupling separate computer units. Instead, the network 540 may also include subsystems that transfer data between computing devices. For example, the network 540 may include a point-to-point connection.

The client computing devices 504 may be any type of computing device previously discussed, including, without limitation, a laptop, smart phone, mobile tablet, television, projector, or other computing device capable of presenting location information that indicates the real-time work and sub-work area locations of the parts corresponding coupled to the wireless beacons 100. In operation, the client computing devices 504 are used by workers who want to view the real-time locations of parts in the manufacturing facility. Such workers may be on the manufacturing floor, in separate offices, or at home using a mobile device (e.g., smart phone, mobile tablet, laptop, etc.) or other type of network-connected computing device.

The database cluster 502 represents one or more servers configured to store and manage databases of historical locations and/or location signals associated with the parts in the manufacturing facility. The historical location signals or history of locations in the manufacturing facility are useful data points that can be analyzed to determine facility production efficiency, employee efficiency, manufacturing or service capacity, and shipping times. The servers in the database cluster 502 may include their own processors, computer-storage media, database software, and other necessary components for maintaining records of part traffic in the manufacturing facility.

In operation, the wireless beacons 100 wirelessly transmit (e.g., via Bluetooth LE or other 2.4 GHz range transmission) location signals to the receiver devices 300, either periodically or upon interrupts triggered by one or more sensors 112. In one embodiment, the receiver devices 300 transmit the location signals—with or without a receiver device ID—to the monitoring server 400. The monitoring server 400 determines the real-time locations of parts in the manufacturing facility by identifying real-time work or sub-work area locations of the wireless beacons 100 on the manufacturing floor using, in one embodiment, the strength of the signals captured by the various receiver devices 300 and the position of the receiver devices 300. The monitoring server 400 may transmit the real-time locations of the parts to the client computing devices 504 for display to users. Additionally, the monitoring server 400 may also transmit the locations of the parts or any data elements of the location signals to the database cluster 502 for storage.

Figure 6A:
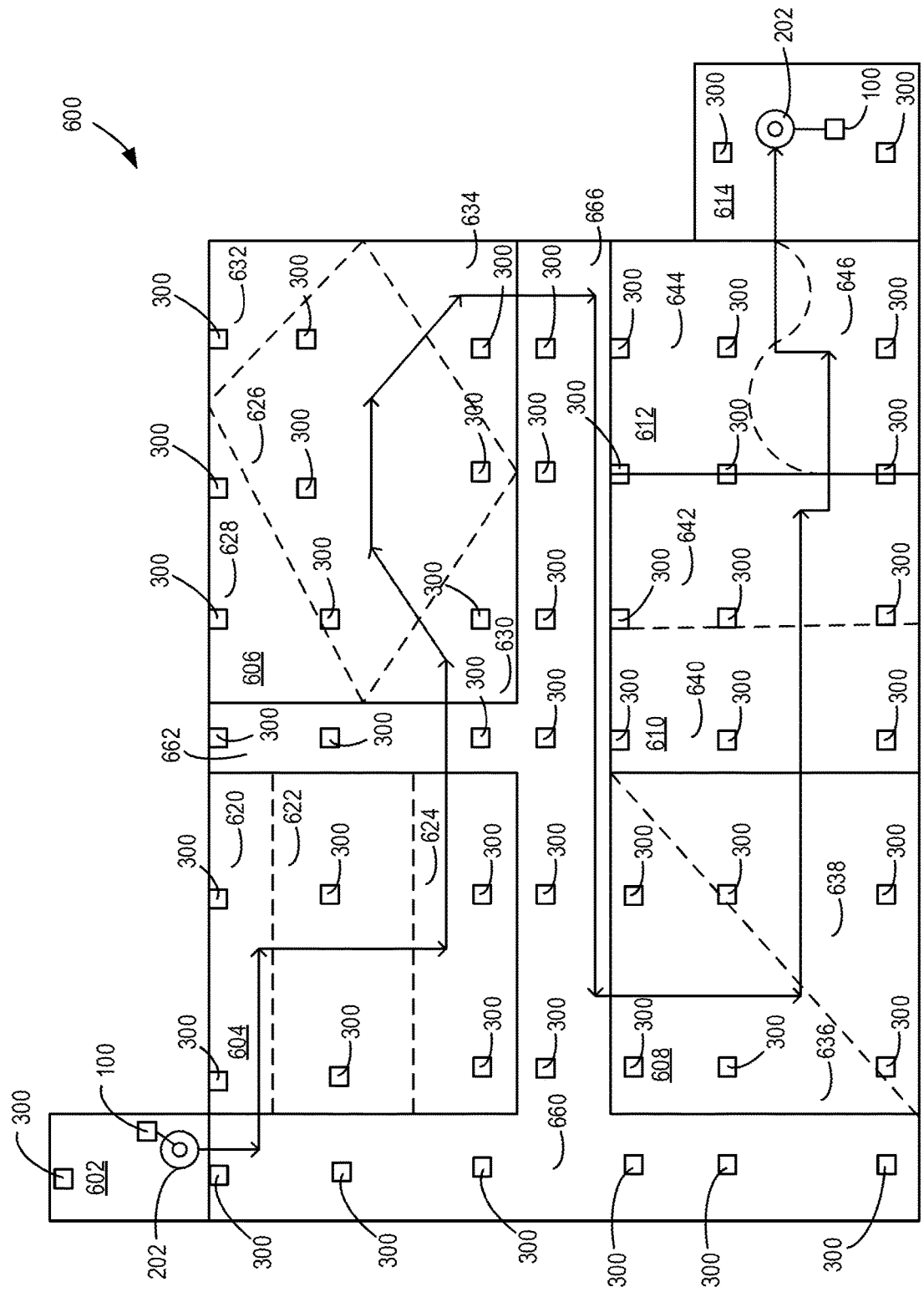
FIG. 6A is a map diagram of a manufacturing, service, wholesale, or retail facility equipped with receiver devices for tracking the real-time location of parts in accordance with some of the disclosed embodiments.
Figure 6B:
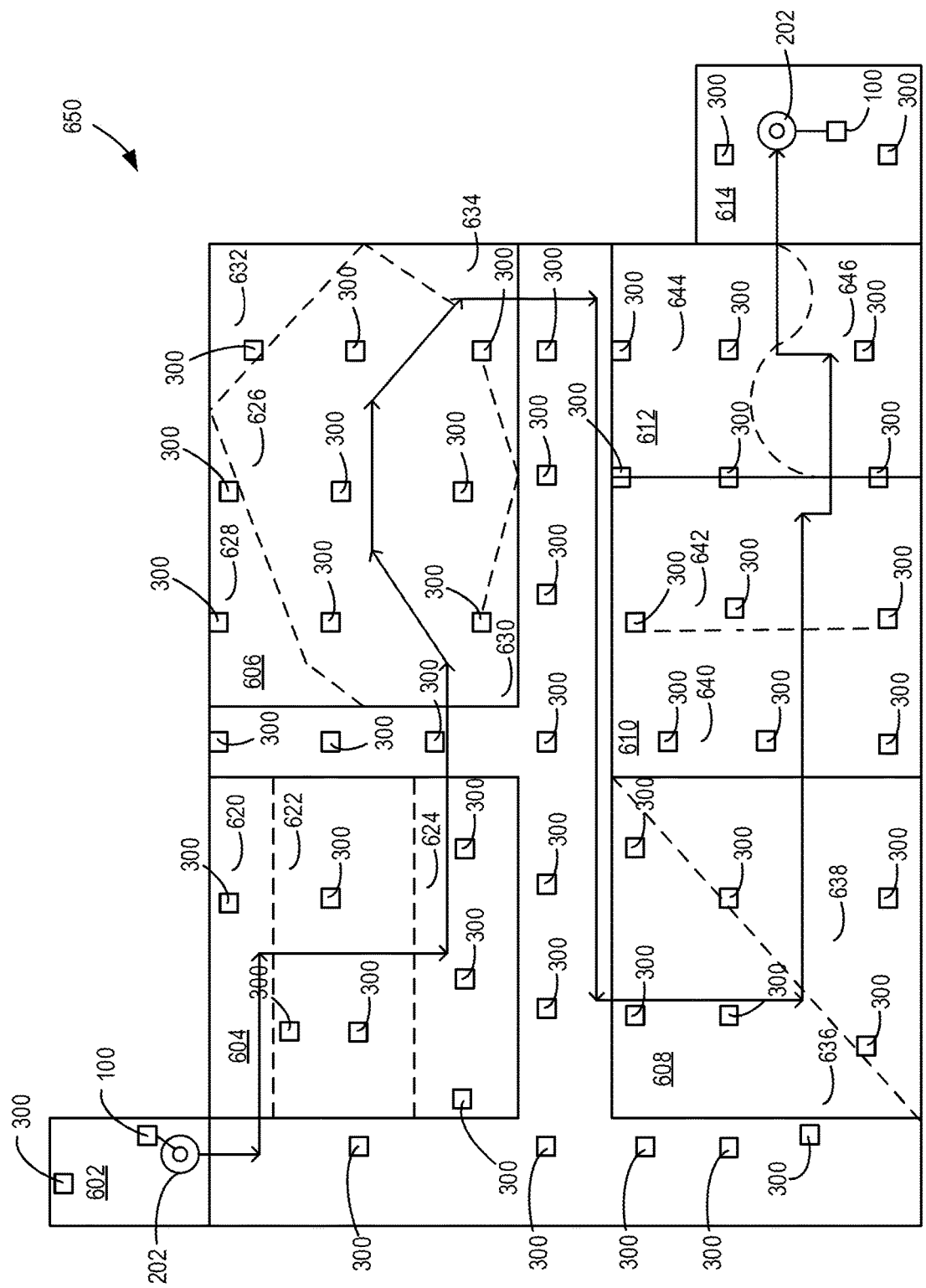
FIG. 6B is a map diagram of a manufacturing, service, wholesale, or retail facility equipped with receiver devices for tracking the real-time location of parts in accordance with some of the disclosed embodiments.

FIGS. 6A and 6B are map diagrams of manufacturing facilities 600 equipped with receiver devices 300 for tracking the real-time locations of parts 202, in accordance with different embodiments. Looking initially at FIG. 6A, the manufacturing facility 600 includes work areas 602, 604, 606, 608, 610, 612, and 614 that are operationally partitioned into various sub-work areas 620, 622, 624, 626, 628, 630, 632, 634, 636, 638, 640, 642, 644, and 646. Also, walkways 660, 662, and 664 represent traffic areas in the manufacturing facility 600. The delineated lines of the work and sub-work areas may be physically partitioned from one another or just operationally separated. For example, work area 604 may be the area in the manufacturing facility 600 dedicated to machining or welding of part 202, and sub-work area 620 may be a holding area, sub-work area 622 may be where the machining of part 202 is performed, and sub-work area 624 may be a finished holding area where parts 202 are stored after machining. The work and sub-work areas may take any shape in the manufacturing facility, as indicated by the various patterns shown.

FIG. 6A shows one embodiment in which receiver devices 300 are strategically placed in a grid-like manner in the manufacturing facility 600. The receivers 300 are specifically oriented at or about 90° angles to each other, in one embodiment. In another embodiment, the monitoring server 400 normalizes location signals by adjusting corresponding signal strengths to effectively make it appear that the receiver devices 300 are positioned in 90° to each other—e.g., one receiver device 300 may actually be positioned at 60° angles to other receiver devices 300, but the adjustment of signal strengths at that receiver device 300 makes it appear as though the receiver device 300 is located at 90°. In still another embodiment, the monitoring server 400 may be configured to machine train the wireless beacons 100 to adjust the strengths of their location signals being broadcast based on determined or prior locations of the wireless beacons 100, as determined by the monitoring server 400. Moreover, FIG. 6B shows an alternative embodiment that strategically positions the receiver devices 300 in concentric patterns. Other patterns and angles may alternatively be used.

The wireless beacon 100 coupled to the part 202 transmits wireless signals as the part moves through the manufacturing facility through work from area 602 to 614. Receiver devices 300 capture the wireless signals and transmit such signals over a network to a monitoring server 400, which, as discussed above, identifies the work area or sub-work area in which the part is currently located.

Figure 7:
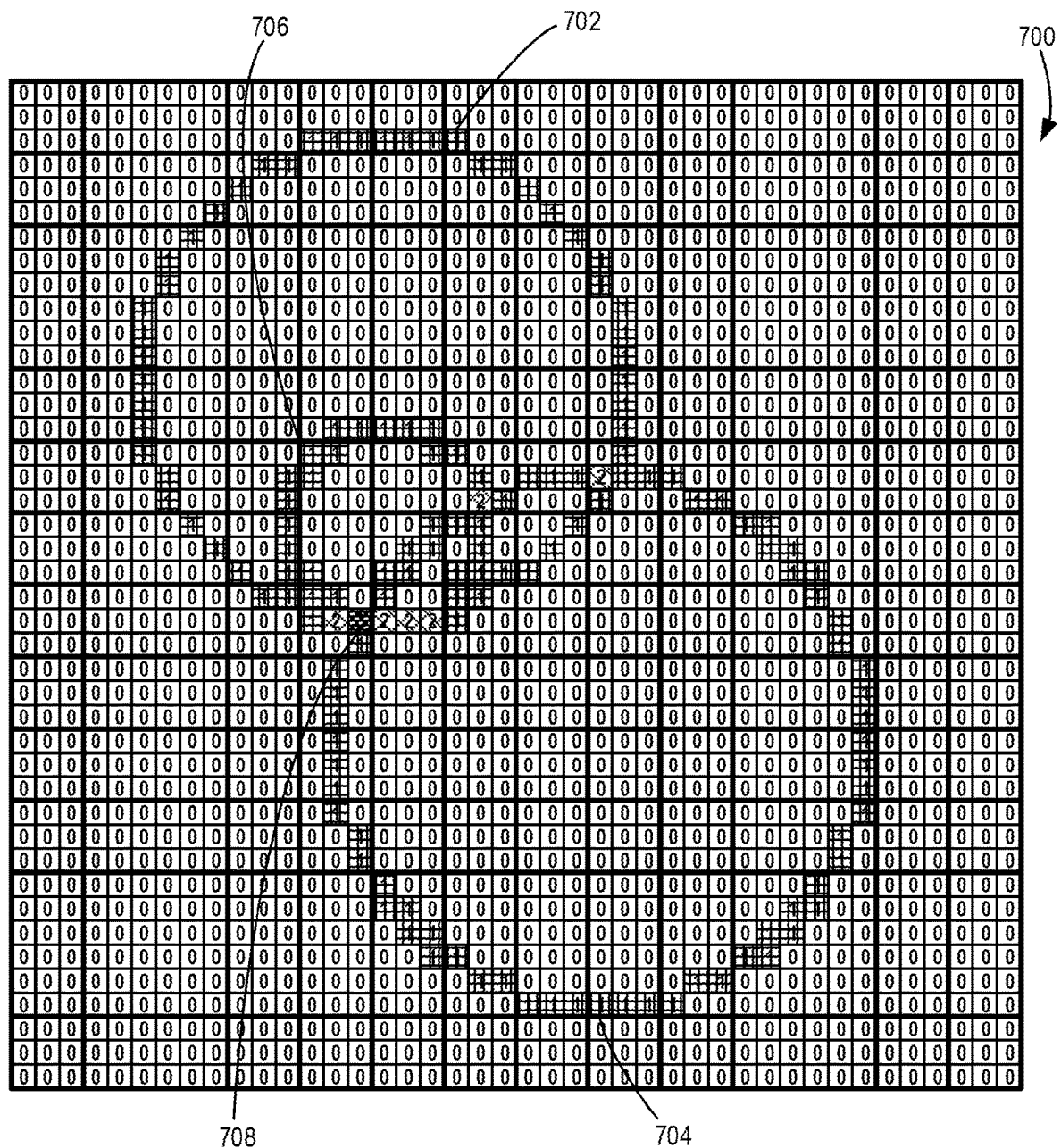
FIG. 7 illustrates a diagram of a technique for determining the location of a part on a manufacturing, service, wholesale, or retail facility in accordance with some of the disclosed embodiments.

FIG. 7 illustrates a diagram of a technique for determining the location of a part in a manufacturing facility, in accordance with one embodiment. In one embodiment, the wireless beacons 100 are equipped to broadcast location signals, and the part location component 414 and receiver device map components 416 of the monitoring server 400 operate to locate the wireless beacon 100 in the following manner. The location of the wireless beacons 100 can be triangulated by comparing the signals received at two, three, or more receiver devices 300. For the sake of clarity, location signals received at three different receiver devices 300 are shown.

The receiver device map component 416 maps the manufacturing facility floor into a grid. The part location component 414 identifies the three receiver devices 300 that received a location signal and retrieves the strength of such signal at each receiver device 300. For each captured location signal, a broadcast radius around each receiver device 300 is estimated based on the strength of each received signal. This may be done in an inverse ratio to the strength of the receiver location signal, such that stronger signals are assigned shorter radii than weaker signals, because stronger signals are more likely closer to their captured receiver devices 300. Possible location circles 702, 704, and 706 on the grid are then figured based on the three radii. The part location component 414 determines a location point 708 for the wireless beacon 100 to be the intersection of at least two of the possible location circles 702, 704, and 706 (e.g., in the embodiment shown, the intersection of three of the possible location circles 702, 704, and 706).

Alternative embodiments may use other shapes than circles to triangulate the location of the wireless beacon 100. For example, squares, triangle, ellipses, or other shapes may be figured on the grid based on the strength of the signals captured by the receiver devices. Also, some embodiments may not have all figured shapes intersect at one point or may have multiple points of intersection. Such embodiments may then identify a location point based on where a plurality of figured shapes intersect.

Finally, the part location component 414 or the receiver device map component 416 may assign values to different points in the grid and maintain counters for each point—almost in a pixel-like manner. The counters for each point may be updated based on whether the figured possible location shape passes through such point. This is illustrated in FIG. 7. Points with no possible location circles 702, 704, or 706 passing through are kept at a "0" value. Points with one possible circle 702, 704, or 706 passing through have been incremented to a "1" value. Points with two possible location circles 702, 704, or 706 passing through have been incremented to a "2" value. The point with all three possible location circles 702, 704, or 706 passing through have been incremented to a "3" value and identified as the location point 708. Thus, the incremented grid may be monitored by the part location component 414 for the highest incremented counter value, and the location point 708 assigned thereto.

Figure 8:
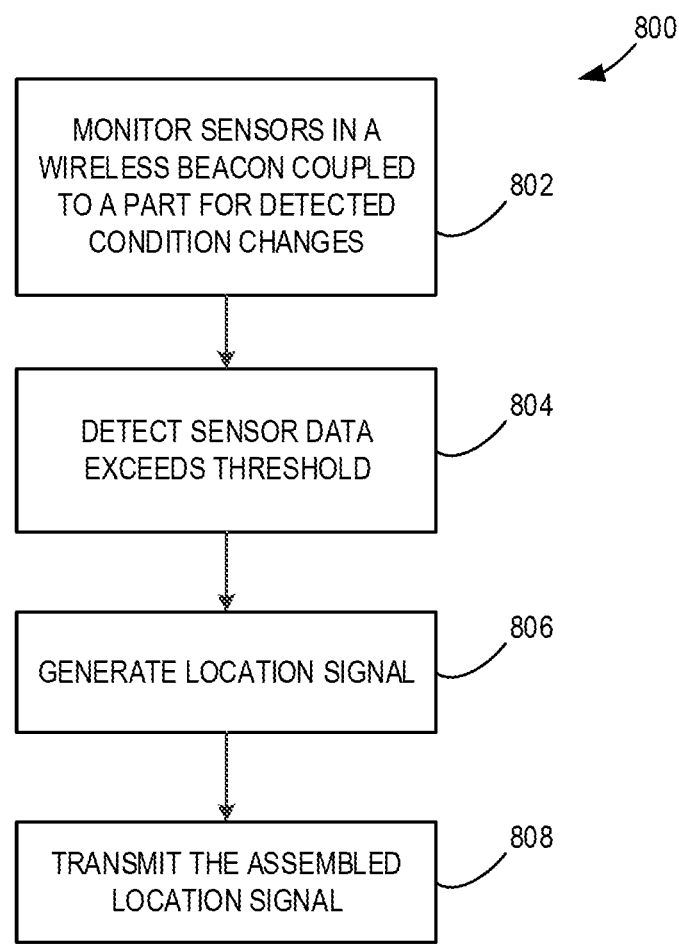
FIG. 8 illustrates a flow chart diagram illustrating a work flow for transmitting location signals of a wireless beacon coupled to a part in accordance with some of the disclosed embodiments.

FIG. 8 illustrates a flow chart diagram illustrating a work flow 800 for transmitting location signals of a wireless beacon coupled to a part, according to one embodiment. The wireless beacon includes one or more sensors (e.g., accelerometer, magnetometer, pressure sensor, photometer, thermometer, GPS sensor, gyroscope, rotational vector sensor, etc.) that are monitored, as indicated at block 802. The sensors collect sensor data, and the wireless beacon repeatedly checks, in one embodiment, whether the collected sensor data exceeds particular sensor thresholds. When threshold condition changes are met or exceeded (as indicated by block 804), the wireless beacon retrieves the location-signal parameters and generates a location signal, as indicated at block 806. The location-signal parameters may include, for example but without limitation, a time stamp, day stamp, beacon ID, and/or part ID. The wireless beacon wirelessly transmits the location signal, as indicated at block 808. In one embodiment, wireless transmission of the location signal occurs via a Bluetooth (e.g., Bluetooth LE) transmission. Other embodiments may transmit the location signal using Zigbee, RFID, WirelessHD, WiGig, or Z-Wave.

Figure 9:
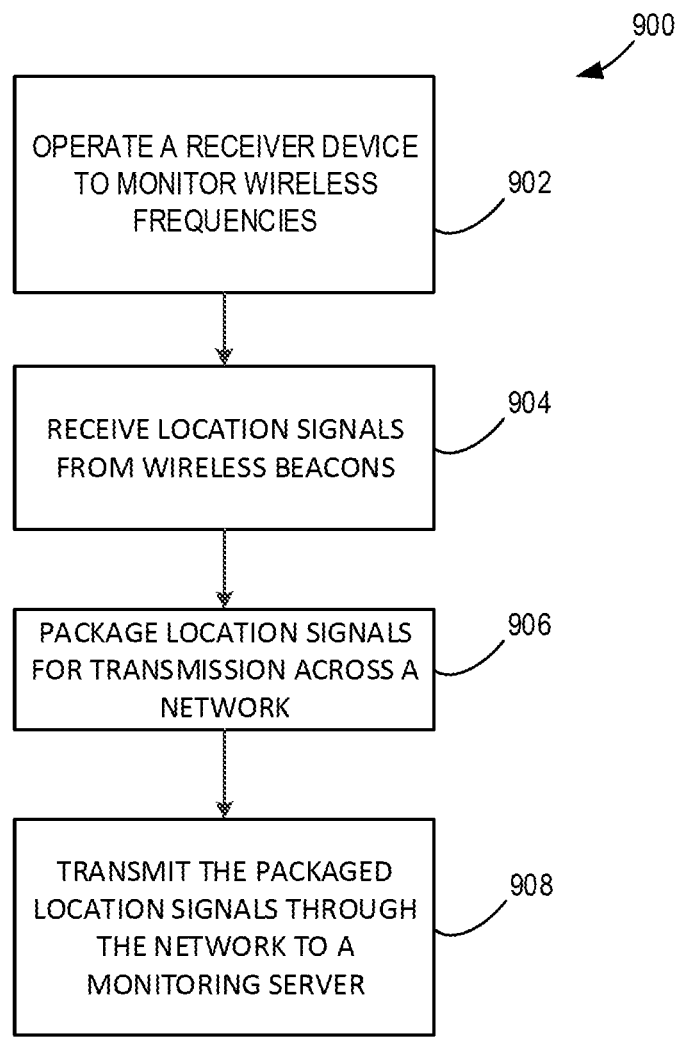
FIG. 9 illustrates a flow chart diagram illustrating a work flow for operating a receiver device in accordance with some of the disclosed embodiments.

FIG. 9 illustrates a flow chart diagram illustrating a work flow 900 for operating a receiver device, according to one embodiment. The receiver device operates in a manufacturing facility to monitor various wireless frequencies (e.g., Bluetooth LE frequencies) for transmissions from wireless beacons, as indicated at block 802. The receiver device receives location signals on the monitored wireless frequencies, as indicated at block 804, and then packages the received location signals from the wireless beacons for transmission across a network, as indicated at block 806. Packaging of the location signals may include appending receiver device identifiers to the location signals or creating data with the receiver device identifier to transmit with the location signals. Alternatively, packaging may mean formatting the location signals, without appending additional information, for transmission across the networks described herein. The packaged location signals, which either include or do not include the receiver device identifier, are transmitted over the network to a monitoring server, as indicated at block 808.

Figure 10:
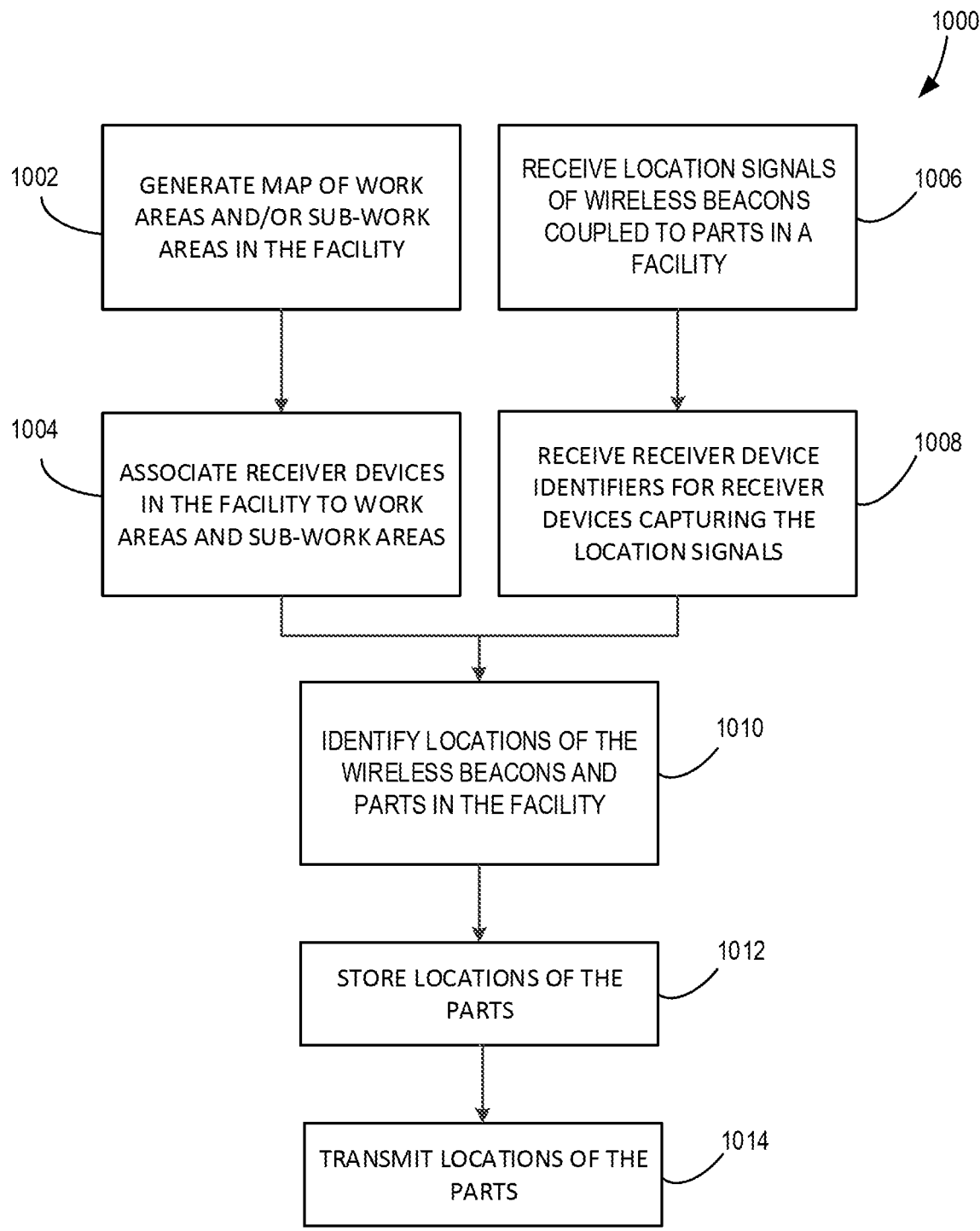
FIG. 10 illustrates a flow chart diagram illustrating a work flow for locating parts in a manufacturing facility in accordance with some of the disclosed embodiments.

FIG. 10 illustrates a flow chart diagram illustrating a work flow 1000 for locating parts in a manufacturing facility, in accordance with one embodiment. A monitoring server generates a map of the work areas and/or sub-work areas in a manufacturing facility, as indicated at block 1002. The work areas or sub-work areas may be specified by a user. Once the work areas and sub-work areas are specified, receiver devices in the facility are associated with the work areas and sub-work areas based on the receiver devices locations in the facility, as indicated at block 1004. One embodiment associates receiver device IDs of the receiver devices with the work and sub-work areas. For example, receiver devices in the welding work area may be associated accordingly.

The monitoring server receives location signals of wireless beacons coupled to parts in the manufacturing facility over a network, as indicated at block 1006. The location signals are received, in one embodiment, from the receiver devices. Additionally, the monitoring server also receives, either along with the location signals or separately, receiver device identifiers that are unique to the receiver devices sending the location signals, as indicated at block 1008. One embodiment uses the location signals, the generated map of work and/or sub-work areas, and the receiver device identifiers to locate wireless beacons in the manufacturing facility being in various work or sub-work areas, as indicated at block 1010. The locations of the wireless beacons are used as the locations of the beacons' coupled parts. For example, the location signals of valve body's coupled wireless beacon and the receiver device identifiers transmitting the location signals may indicate a valve body is in a shipping work area. Locations of the parts may be stored, as indicated at 1012, or transmitted to client computing devices for presentation to a user.

Tracking the real-time locations of parts provides numerous benefits over conventional manufacturing part-tracking systems. Using the wireless beacons described herein as trackers of parts eliminates the need to constantly hunt down paperwork to determine where parts are located. This saves worker time and increases worker production. Tracking parts electronically eliminates many costly and unsafe human errors associated with inaccurately filling out paperwork or otherwise noting when and where parts have been moved.

The various embodiments also greatly enhance safety in manufacturing facilities with large machinery, because the electronic part-tracking system components disclosed herein largely reduce the amount of time workers need to spend hunting for parts in work areas in which they are not working and running paperwork to and from offices for proper storage. Thus, the various embodiments help keep workers put in their respective work areas, thereby reducing worker traffic in the manufacturing facility and diminishing work accidents caused by heavy machinery that has to move throughout the facility. For example, a worker who spends more time in a welding area is at less risk at getting struck by a forklift carrying parts between other work areas of a facility. Moreover, along the lines of safety, some parts in manufacturing facilities may be hazardous (e.g., in a nuclear-part facility) and only allowed to be handled or exposed to certain accredited workers. Reducing the amount of workers straying out of their respective work areas reduces the number of people accidentally coming into contact with parts they are not trained to handle.

Additionally, the embodiments disclosed herein allow manufacturing facilities to tighten up their safety programs. Tracking parts through a given facility allows safety managers to get a better understanding of where work bottlenecks occur. Once these are understood, work areas can be easily reorganized for more efficiency and to enhance safety.

The use of wireless beacons that only transmit location signals upon sensed events allows some embodiments to greatly reduce the amount of battery power needed by the wireless beacons disclosed herein to track parts in a facility. Also, the transmission of sensor data as part of the location signals, along with various part or beacon identifiers, provides a highly accurate way to locate parts in a manner that does not require human interaction.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

The subject matter disclosed herein is described with specificity to meet statutory requirements. The description itself is not intended to limit the scope of this patent. Rather, the inventor has contemplated that the claimed subject matter might also be embodied in other ways, to include different steps or combinations of steps similar to the ones described in this document, in conjunction with other present or future technologies. Although the terms "step" and/or "block" may be used herein to connote different elements of methods employed, the terms should not be interpreted as implying any particular order among or between various steps herein disclosed unless and except when the order of individual steps is explicitly described. The order of execution or performance of the operations in examples of the disclosure illustrated and described herein is not essential, unless otherwise specified. The operations may be performed in any order, unless otherwise specified, and examples of the disclosure may include additional or fewer operations than those disclosed herein. It is therefore contemplated that executing or performing a particular operation before, contemporaneously with, or after another operation is within the scope of aspects of the disclosure.

What is claimed is:

1. A system for tracking parts through different work areas of a manufacturing or service facility, the system comprising:
   at least one wireless beacon attached to a part located in the manufacturing or service facility, the at least one wireless beacon configured to independently wirelessly transmit a location signal as the part moves through the different work areas, wherein the location signal comprises a part number of the part to which the at least one wireless beacon is attached;
   a plurality of receiver devices placed at fixed locations in the manufacturing or service facility that are configured to receive, at the fixed locations, the location signal comprising the part number from the at least one wireless beacon and transmit at least the part number of the location signal and corresponding receiver identifiers of the plurality of receiver devices across a network; and one or more monitoring servers configured determine a location of the part in the manufacturing or service facility based upon the received part number of the location signal and the corresponding receiver identifiers of the receiver devices in the fixed locations that received the location signal.

2. The system of claim 1, wherein the at least one wireless beacon comprises a transmission circuit configured to wirelessly transmit the location signal using a low-energy wireless transmission.

3. The system of claim 1, wherein the at least one wireless beacon comprises memory configured to store a unique beacon identifier specific to the at least one wireless beacon.

4. The system of claim 1, wherein the at least one wireless beacon comprises one or more sensors that capture sensor data that is used to determine when to wirelessly transmit the location signal.

5. The system of claim 1, wherein the at least one wireless beacon comprises a Bluetooth beacon configured to independently wirelessly transmit the location signal.

6. The system of claim 4, wherein the one or more sensors comprise and accelerometer and the at least one wireless beacon is configured to wirelessly transmit the location signals when the accelerometer senses a threshold acceleration or movement.

7. The system of claim 4, wherein the one or more sensors comprise at least one member of a group comprising a magnetometer, a thermometer, a global positioning system (GPS) sensor, a pressure sensor, a photometer, a gyroscope, and a rotational vector sensor.

8. The system of claim 7, wherein the location signal comprises sensor that is transmitted across the network to the one or more monitoring services, and wherein the monitoring services determine the real-time location of the part based, at least in part, on the sensor data.

9. The system of claim 1, wherein the one or more monitoring servers are configured to determine the locations of the part by triangulating location points in the manufacturing or service facility using strengths of the location signal received at the plurality of receiver devices.

10. The system of claim 1, wherein each of the plurality of receiver devices is configured to transmit a receiver device identifier to the one or more monitoring servers along with the location signal.

11. The system of claim 1, wherein the part comprises at least member of a group comprising: a fluid end, a swivel, a joint, a manifold trailer, safety iron, a safety hammer, a dart valve, a plug valve, a clapper check valve, a pressure relief valve, an emergency unloading valve, a gate valve, a subsea dosage valve, a hydraulic valve, a valve seat, a butterfly valve, a steadseal valve, a hyperseal valve, a Polytetrafluoroethylene-lined valve, a swingthrough valve, a rubber-sealing valve, a rubber-line valve, a fire safe valve, a swing and lift check valve, a T-pattern globe valve, a Y-pattern globe valve, a three-way globe valve, a compressor check valve, a cold reheat check valve, a cold heat check valve, a testable check valve, a reverse current valve, a parallel slide valve, a gate valve, a safety valve, a safety relief valve, an isolation valve, a relief valve, a mounted-ball valve, a ball valve, a diaphragm valve, a triple offset butterfly valve, a gate and globe valve, a check valve, a lift check valve, a swing check valve, a steam isolation valve, a feedwater isolation valve, an integrated safety valve, a single-stage turbine, a multi-stage turbine, a hydraulic turbine, a pump turbine, a quad-runner turbine, a gear operator, a pneumatic actuator, a pressure control panel, a lifting clamp, a flow line safety restraint, a choke, a drop ball injector, a pump, a blowout preventer, a gas separator, an overshot connector, a wellhead, a frac pump, a manifold system, a fluid end system, a slurry pump, a water pump, a subsea pump, a premix tank, a frac tree, a swellable packer, a manifold skid, a tubing head, a wellhead, a rod rotator, a stuffing box, casing head, a tubing head, or a control valve.

12. A method for tracking parts through different work areas of a manufacturing or service facility, the method comprising:
receiving, from a wireless beacon attached to a part, a location signal comprising a part number specific to the part as the wireless beacon moves through the different work areas in the manufacturing or service facility, wherein the location signal is independently transmitted by the wireless beacon;
receiving, from a plurality of receiver devices located at fixed locations in the manufacturing or service facility, different instances of the part number of the location signal and corresponding receiver identifiers of the plurality of receiver devices that received the location signal; and
determining, at the one or more monitoring servers, a location of the part in the manufacturing or service facility based upon the received different instances of the part number and the receiver identifiers of the plurality of receiver devices that received the location signal.

13. The method of claim 12, wherein the location signal is independently and wirelessly transmitted from the wireless beacons using a Bluetooth low-energy wireless transmission.

14. The method of claim 12, further comprising receiving a unique beacon identifier related to the at least one wireless beacon.

15. The method of claim 12, wherein the location signal comprises a purchase order number for the part.

16. The method of claim 15, wherein the one or more sensors comprise at least one member of a group comprising an accelerometer, a magnetometer, a thermometer, a global positioning system (GPS) sensor, a pressure sensor, a photometer, a gyroscope, and a rotational vector sensor.

17. The method of claim 16, wherein the location signal comprises sensor data that is transmitted across the network to the one or more monitoring services, and wherein the monitoring services determine the real-time location of the part based, at least in part, on the sensor data.

18. The method of claim 12, wherein the part comprises at least member of a group comprising: a fluid end, a swivel, a joint, a manifold trailer, safety iron, a safety hammer, a dart valve, a plug valve, a clapper check valve, a pressure relief valve, an emergency unloading valve, a gate valve, a subsea dosage valve, a hydraulic valve, a valve seat, a butterfly valve, a steadseal valve, a hyperseal valve, a Polytetrafluoroethylene-lined valve, a swingthrough valve, a rubber-sealing valve, a rubber-line valve, a fire safe valve, a swing and lift check valve, a T-pattern globe valve, a Y-pattern globe valve, a three-way globe valve, a compressor check valve, a cold reheat check valve, a cold heat check valve, a testable check valve, a reverse current valve, a parallel slide valve, a gate valve, a safety valve, a safety relief valve, an isolation valve, a relief valve, a mounted-ball valve, a ball valve, a diaphragm valve, a triple offset butterfly valve, a gate and globe valve, a check valve, a lift check valve, a swing check valve, a steam isolation valve, a feedwater isolation valve, an integrated safety valve, a single-stage turbine, a multi-stage turbine, a hydraulic turbine, a pump turbine, a quad-runner turbine, a gear operator, a pneumatic actuator, a pressure control panel, a lifting clamp, a flow line safety restraint, a choke, a drop ball injector, a pump, a blowout preventer, a gas separator, an overshot connector, a wellhead, a frac pump, a manifold system, a fluid end system, a slurry pump, a water pump, a subsea pump, a premix tank, a frac tree, a swellable packer, a manifold skid, a tubing head, a wellhead, a rod rotator, a stuffing box, casing head, a tubing head, or a control valve.

19. Non-transitory memory devices embodied with instructions executable to perform operations for tracking parts through different work areas of a manufacturing or service facility, the computer-storage memory, comprising:

receiving, from a wireless beacon attached to a part, a location signal as the wireless beacon moves through the different work areas in the manufacturing or service facility, the location signal comprising a part number specific to the part to which the wireless beacon is attached;

receiving, from a plurality of receiver devices that are stationed at fixed locations in the manufacturing or service facility, different instances of the part number of the location signal and corresponding receiver identifiers of the plurality of receiver devices that received the location signal; and determining, at the one or more monitoring servers, a location of the part in the manufacturing or service facility based only on the received radio frequency transmission of the part number and the receiver identifiers of the plurality of receiver devices that received the location signal.

20. The non-transitory memory devices of claim 19, wherein the wireless beacon comprises a Bluetooth low energy (Bluetooth LE) circuit.

* * * * *